(12) United States Patent  (10) Patent No.: US 9,113,525 B2
Leung et al.  (45) Date of Patent: Aug. 18, 2015

(54) LED SWITCH CIRCUITRY FOR VARYING INPUT VOLTAGE SOURCE

(71) Applicant: HUIZHOU LIGHT ENGINE LTD., Huizhou (CN)

(72) Inventors: Wa-Hing Leung, Hong Kong (CN); Johnny Siu, Hong Kong (CN)

(73) Assignee: Huizhou Light Engine Ltd., Guangdong (CN)

( * ) Notice: Subject to any disclaimer, the term of this patent is extended or adjusted under 35 U.S.C. 154(b) by 0 days.

(21) Appl. No.: 14/610,481

(22) Filed: Jan. 30, 2015

(65) Prior Publication Data

US 2015/0156831 A1   Jun. 4, 2015

Related U.S. Application Data

(63) Continuation of application No. 13/035,556, filed on Feb. 25, 2011, now Pat. No. 8,947,014, which is a continuation-in-part of application No. 12/955,030, filed on Nov. 29, 2010, now Pat. No. 8,508,140.

(60) Provisional application No. 61/373,058, filed on Aug. 12, 2010.

(51) Int. Cl.
*H05B 37/02* (2006.01)
*G09G 3/34* (2006.01)
*H05B 33/08* (2006.01)

(52) U.S. Cl.
CPC .......... *H05B 33/083* (2013.01); *H05B 33/0824* (2013.01); *H05B 33/0845* (2013.01)

(58) Field of Classification Search
USPC .......................... 315/291, 294, 297, 312, 307
See application file for complete search history.

(56) References Cited

U.S. PATENT DOCUMENTS

2010/0308739 A1* 12/2010 Shteynberg et al. .......... 315/193

* cited by examiner

*Primary Examiner* — Douglas W Owens
*Assistant Examiner* — Jonathan Cooper
(74) *Attorney, Agent, or Firm* — Schiff Hardin LLP

(57) ABSTRACT

An LED array switching apparatus, comprises: a plurality of LED arrays arranged in a serial path; a voltage supply coupled to the plurality of LED arrays; a plurality of current sources selectively coupled to the LED arrays, each of the current sources being switchable between a current regulating state and an open state; and a controller that outputs at least one control signal. The controller, the at least one switch and current sources cooperate together such that: when the voltage of the voltage source is below the at least one reference voltage, and/or when a predetermined level of current passes through the one or more current sources, at least one switch is closed and one or more associated current sources are controlled so as to break the serial path into one or more parallel paths each including less than all of the LED arrays.

20 Claims, 38 Drawing Sheets

LED SWITCH CIRCUITRY FOR VARYING INPUT VOLTAGE SOURCE

CROSS-REFERENCE TO RELATED APPLICATIONS

This application is a continuation of U.S. application Ser. No. 13/035,556, filed Feb. 25, 2011, which is a continuation-in-part of U.S. application Ser. No. 12/955,030, filed Nov. 29, 2010, which claims benefit of U.S. Provisional Patent Application No. 61/373,058, filed Aug. 12, 2010, the entirety of each of which are incorporated by reference herein.

BACKGROUND OF THE INVENTION

The present invention relates to switching circuitry used in driving LED light sources. In particular, circuitry in which LEDs are driven by a regulated current source.

Conventionally, LEDs may be driven by a current source that regulates the current flowing through the LEDs and hence maintains the light output of the LEDs. FIG. 1 shows a typical circuit for driving an LED circuit in which V is an input voltage source, D is representative of a string of LEDs and G is a current source. In such a circuit, in order for current to flow through D, the source input voltage of V must be higher than the forward voltage of the LEDs D.

However, if voltage of input voltage source V is much higher than the forward voltage of D, a large voltage drop is present in current source G. Such an occurrence may cause a significant power loss in current source G, particularly if current source G is a linear current source.

BRIEF SUMMARY OF THE INVENTION

In accordance with a first aspect of the present invention, an LED array switching apparatus comprises: a plurality of LED arrays arranged in a serial path, each LED array having a forward voltage; a voltage supply coupled to the plurality of LED arrays; a plurality of current sources selectively coupled to the LED arrays, each of the current sources being switchable between a current regulating state and an open state; and a controller that outputs at least one control signal generated based on at least one of: (a) at least one comparison between the voltage of the voltage supply and at least one reference voltage, and (b) currents through one or more of the current sources, the control signals controlling the turning on and off of at least one switch and a current source associated with the at least one switch. The controller, the at least one switch and current sources cooperate together such that: when the voltage of the voltage source is below the at least one reference voltage, and/or when a predetermined level of current passes through the one or more current sources, at least one switch is closed and one or more associated current sources are controlled so as to break the serial path into one or more parallel paths each including less than all of the LED arrays.

In another aspect, for at least a portion of time during which the voltage of the voltage supply is below at least one reference voltage, the one or more parallel paths comprise a plurality of parallel paths each including at least one of the LED arrays, the plurality of parallel paths supplying current to all of the LED arrays.

In another aspect, the LED array switching apparatus further comprises: at least one diode arranged in the serial path of the LED arrays intermediate between a first group of LED arrays and a second group of LED arrays; and a switchable parallel current path that connects the voltage supply to a point in the serial path between the diode and the second group of LED arrays, the at least one diode preventing current from the parallel current path from flowing in the direction of the first group of LED arrays.

In another aspect, the number of LED arrays in the first group of LED arrays is equal to the number of LED arrays in the second group of LED arrays.

In another aspect, a plurality of parallel paths supplies current to all of the LED arrays when the voltage of the voltage source is higher than the forward voltage of both of the first or second group of LED arrays, but is less than the at least one reference voltage.

In another aspect, the voltage source is a rectified AC voltage, and the switching apparatus further comprises: valley-fill circuitry configured to prevent occurrence of any off period of light output at a zero crossing portion of the AC voltage.

In another aspect, the valley-fill circuitry includes at least one energy storage capacitor that discharges when the rectified AC voltage drops below half its peak value to prevent any off period of the light output.

In another aspect, at least one of the plurality of LED arrays comprises a plurality of LEDs.

In another aspect, the plurality of LEDs forming the at least one of the plurality of LED arrays are arranged in parallel.

In another aspect, the controller comprises one or more voltage comparators.

In another aspect, the controller comprises a microcontroller.

In another aspect, the microcontroller is configured to detect a fault in an LED array and modify a switching sequence to exclude the faulted LED array.

In another aspect, the at least one reference voltage is a plurality of reference voltages, and the at least one switch is a plurality of switches, and each of the plurality of reference voltages corresponds with a respective one of the switches.

In accordance with a second aspect of the present invention, an LED array switching apparatus comprises: a plurality of LED arrays arranged in a serial path, each LED array having a forward voltage; a voltage supply coupled to the plurality of LED arrays; a voltage comparator that compares the voltage of the voltage supply with a reference voltage and controls a switch to turn off when the voltage of the voltage supply is greater than or equal to the reference voltage; and a plurality of current sources selectively coupled to the LED arrays each of the current sources is switchable between a current regulating state and an open state. The voltage comparator, the switch and current sources cooperate together such that: (a) when the voltage of the voltage source is below the reference voltage, the switch is closed and the current sources are controlled so as to break the serial path into one or more parallel paths each including less than all of the LED arrays, and (b) when the voltage of the voltage supply is greater than or equal to the reference voltage, as the voltage of the voltage supply increases, LED arrays are switched on and lit to form a higher forward voltage LED string, and as the voltage of the voltage supply decreases, LED arrays are switched off and removed from the LED string starting with the most recently lit array.

In another aspect, for at least a portion of time during which the voltage of the voltage supply is below the reference voltage, the one or more parallel paths comprise a plurality of parallel paths each including at least one of the LED arrays, the plurality of parallel paths supplying current to all of the LED arrays.

In another aspect, the LED array switching apparatus further comprises: a diode arranged in the series path of the LED arrays intermediate between a first group of LED arrays and a second group of LED arrays; and a switchable parallel current path that connects the voltage supply to a point in the series path between the diode and the second group of LED arrays, the diode preventing current from the parallel current path from flowing in the direction of the first group of LED arrays.

In another aspect, the number of LED arrays in the first group of LED arrays is equal to the number of LED arrays in the second group of LED arrays.

In another aspect, a plurality of parallel paths supplies current to all of the LED arrays when the voltage of the voltage source is higher than the forward voltage of both of the first or second group of LED arrays, but is less than the reference voltage.

In another aspect, the voltage source is a rectified AC voltage, and the switching apparatus further comprises: valley-fill circuitry configured to prevent occurrence of any off period of light output at a zero crossing portion of the AC voltage.

In another aspect, the valley-fill circuitry includes at least one energy storage capacitor that discharges when the rectified AC voltage drops below half its peak value to prevent any off period of the light output.

In another aspect, the sum of the forward voltages of LED arrays in the first group of LED arrays is approximately equal to sum of the forward voltages of the LED arrays in the second group of LED arrays.

In another aspect, at least one of the plurality of LED arrays comprises a plurality of LEDs.

In another aspect, the plurality of LEDs forming the at least one of the plurality of LED arrays are arranged in parallel.

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings in which.

DETAILED DESCRIPTION OF THE INVENTION

FIGS. 2-34 illustrate aspects of preferred embodiments of LED array switching apparatus. For an LED lighting device to work using a varying input voltage source, such as a rectified AC source, the switching apparatus in accordance with the first embodiment of the present invention divides the LED string into a series of multiple arrays. When the input voltage is low, only the first LED array is lit up. As the input voltage increases, subsequent LED arrays are switched in series to form a higher forward voltage string. Contrarily, if the input voltage decreases, the sequence is reversed and arrays are removed from the string starting with the last light-up array.

Figure 2:
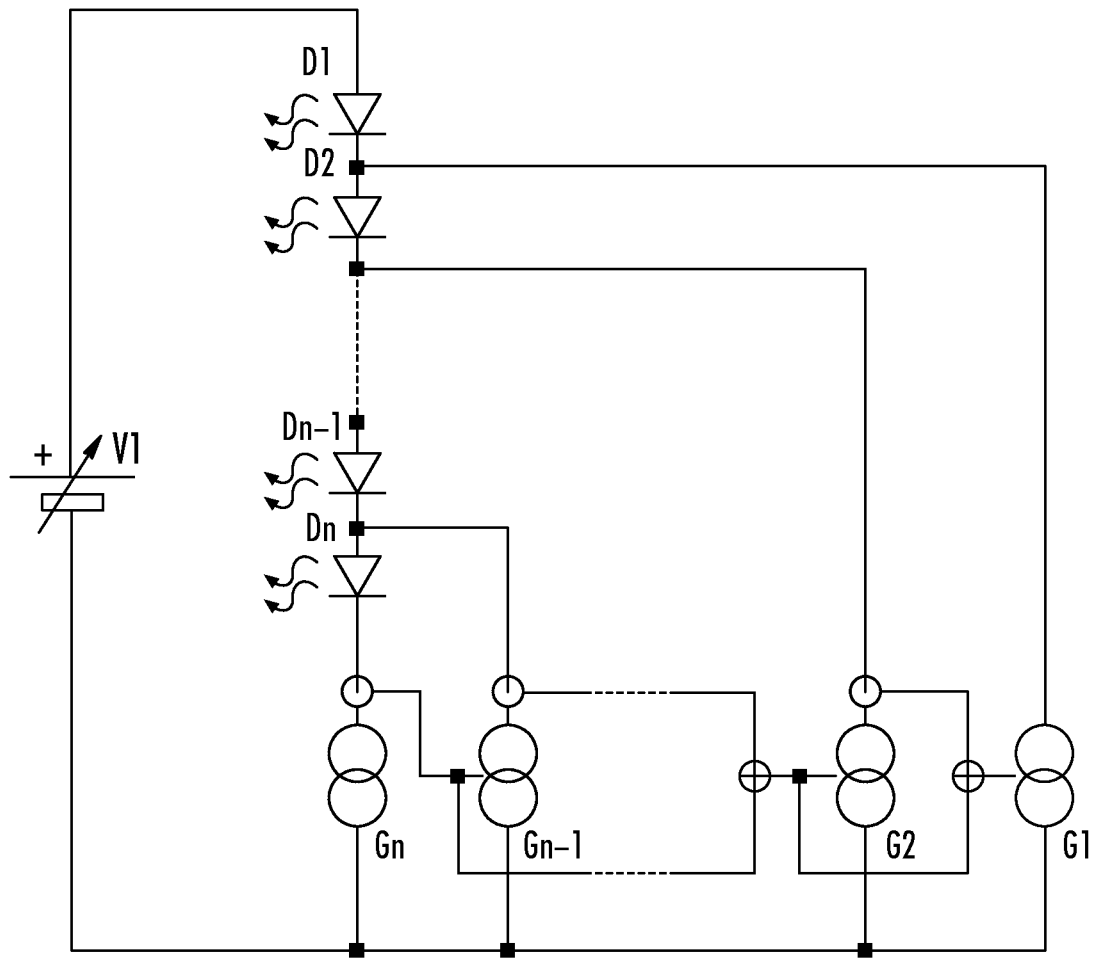
FIG. 2 is functional block diagram of a circuit for LED array switching in accordance with an embodiment of the present invention.

FIG. 2 shows the functional blocks of proposed circuitry. It is assumed that the LED string is divided into n LED arrays or arrays D1 to Dn, where n>1. Each LED array may consist of one or more LEDs arranged in any know manner, i.e., in sequence or in parallel, or combinations thereof. G1 to Gn are current sources which can be disabled, that is, changed to an open circuit condition, by current sense signals from successive current sources.

Figure 3A:
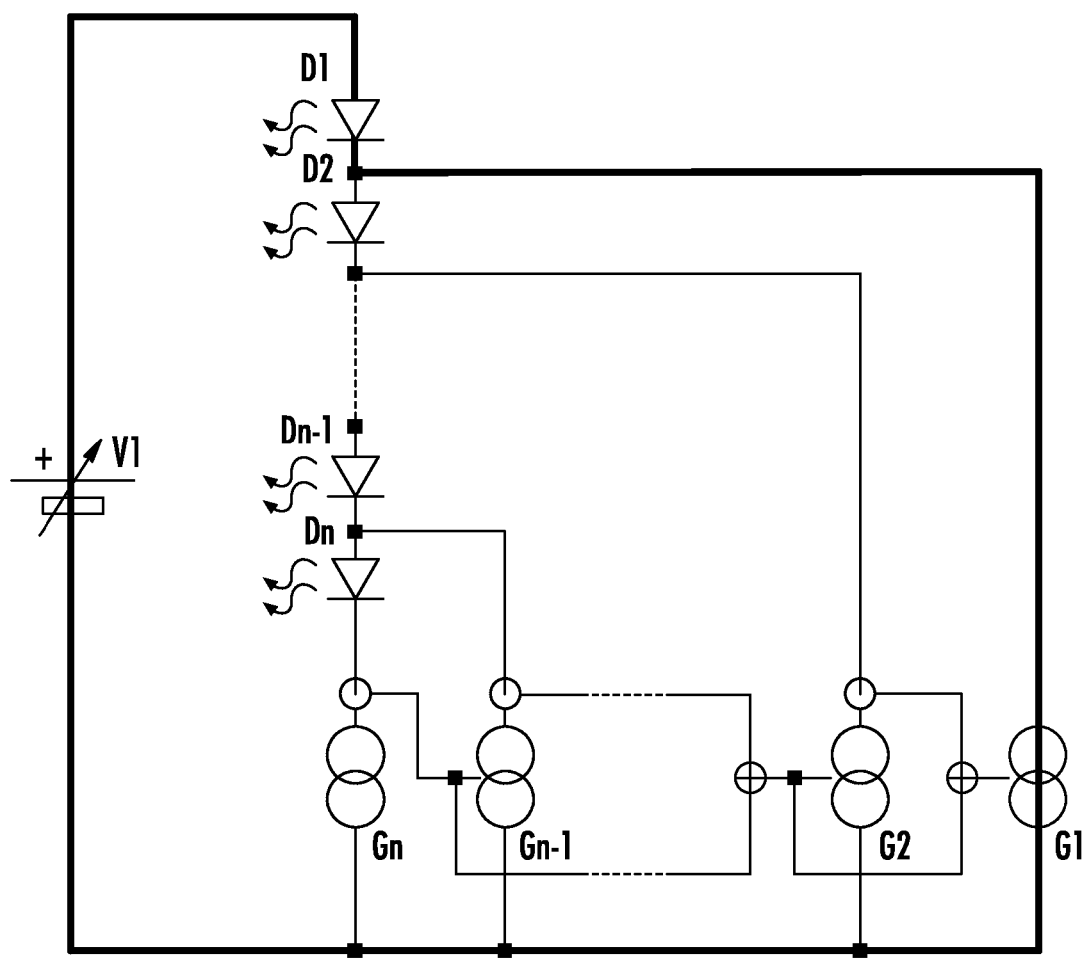
FIGS. 3A-3F are diagrams illustrating current paths taken through the circuit of FIG. 2 at different voltages levels of the source voltage, in accordance with an embodiment of the present invention.
Figure 3B:
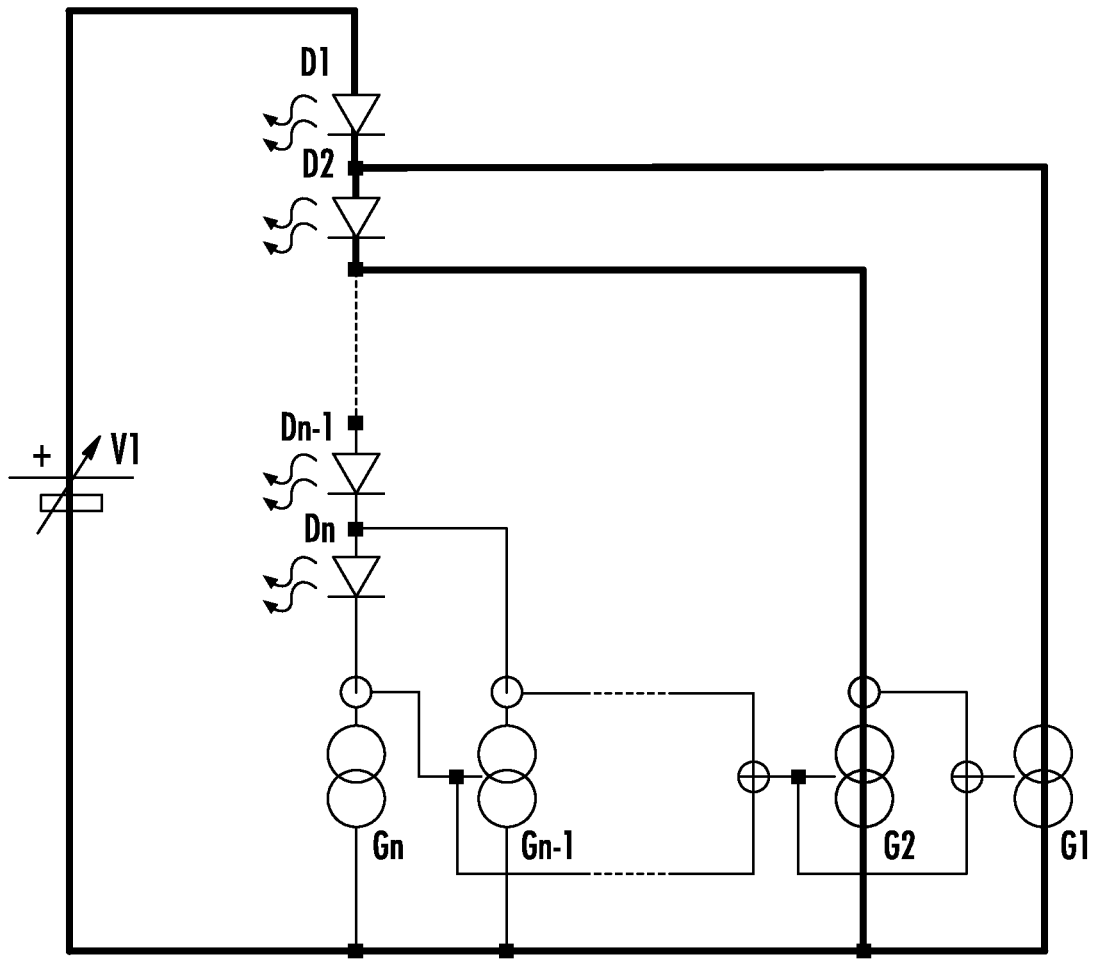
Figure 3C:
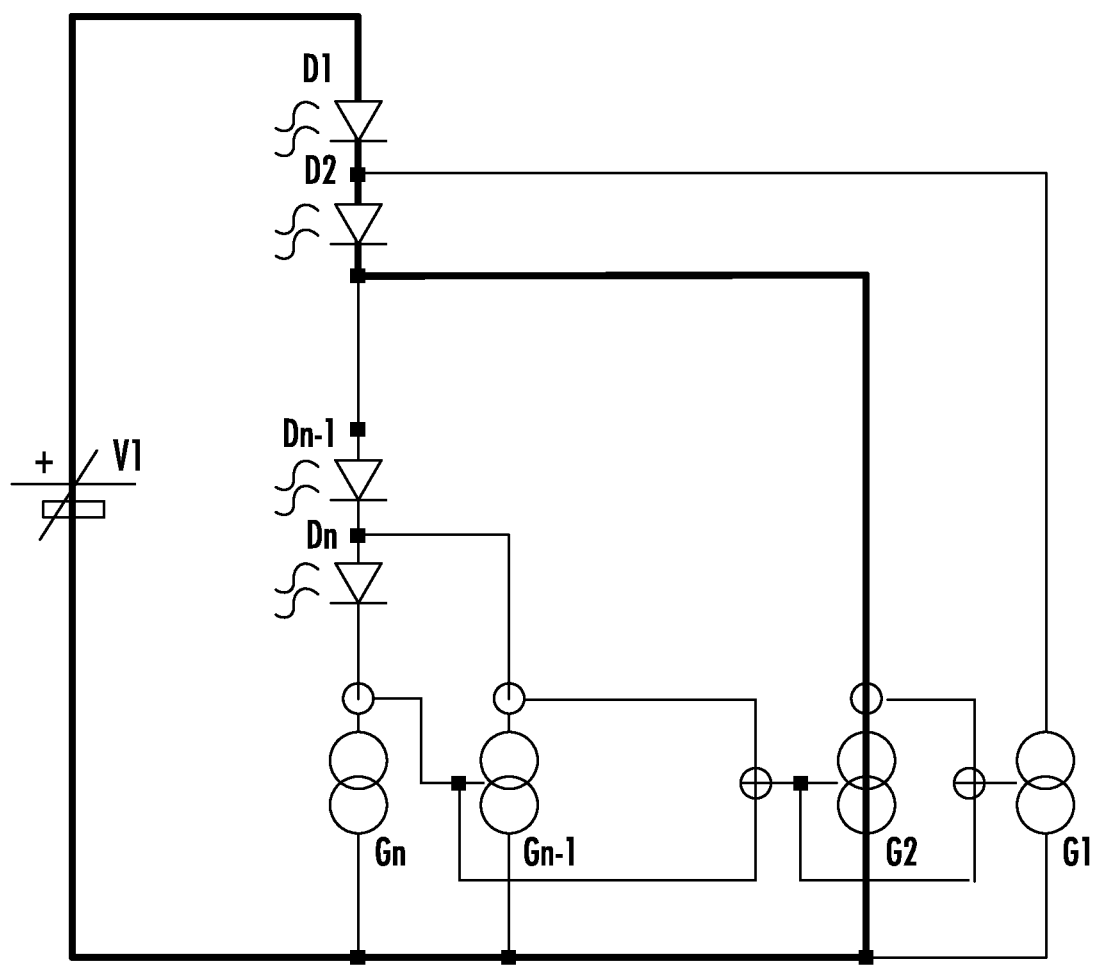

The operation of the circuit of FIG. 2 is next described making reference to FIGS. 3A-3F, for the case in which the voltage of V1 is ramping up from zero. When the voltage of V1 is just above the forward voltage of LED array D1, current begins to flow through LED array D1 and current source G1, as shown in FIG. 3A. Current source G1 regulates the current through LED array D1 as voltage of V1 is further increased. LED array D2 begins to conduct when V1 reaches the sum of the forward voltages of LED array D1 and LED array D2, as shown in FIG. 3B. As the current through LED array D2 is increasing to a threshold value, which is preferably set lower than the regulating value of current source G2, current source G1 is disabled, becoming an open circuit. The current through LED array D1 and LED array D2 is then regulated by current source G2, as shown in FIG. 3C.

Figure 3D:
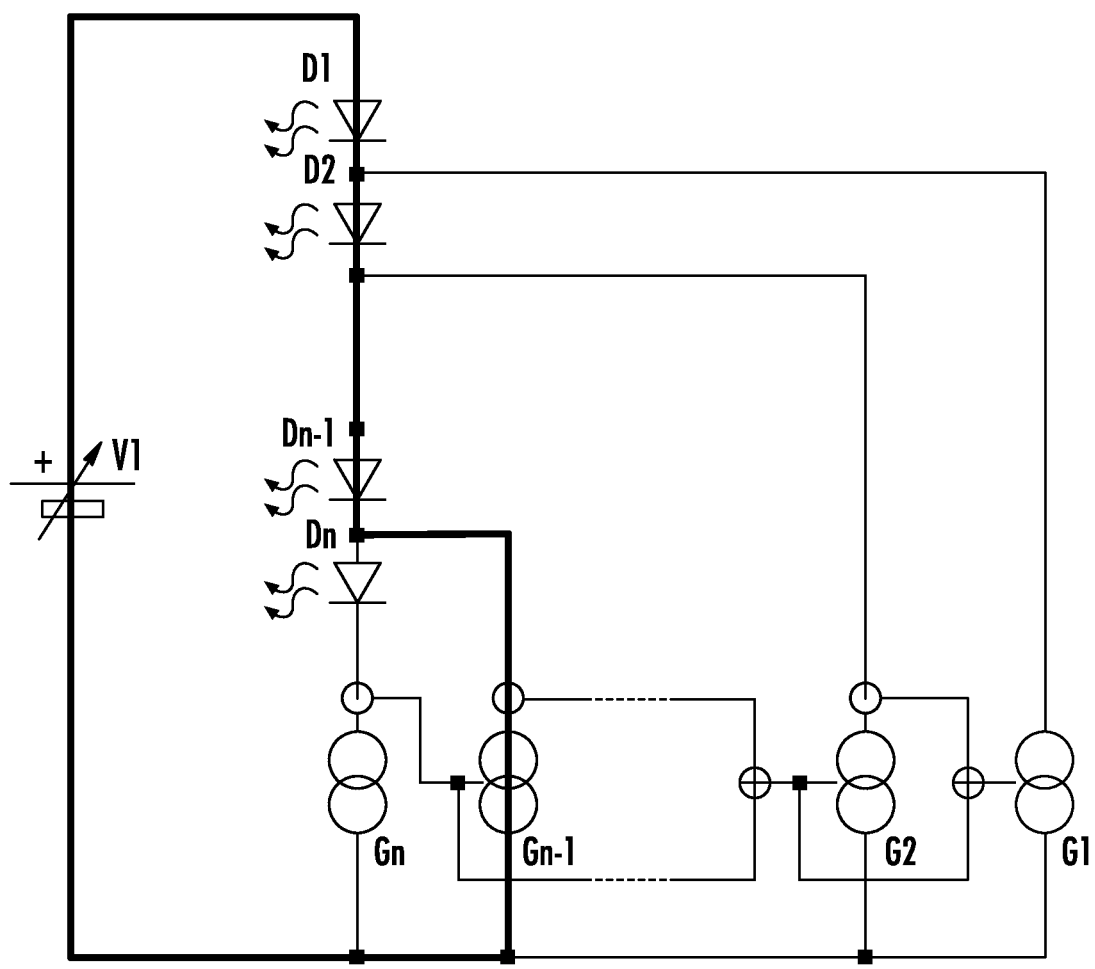
Figure 3E:
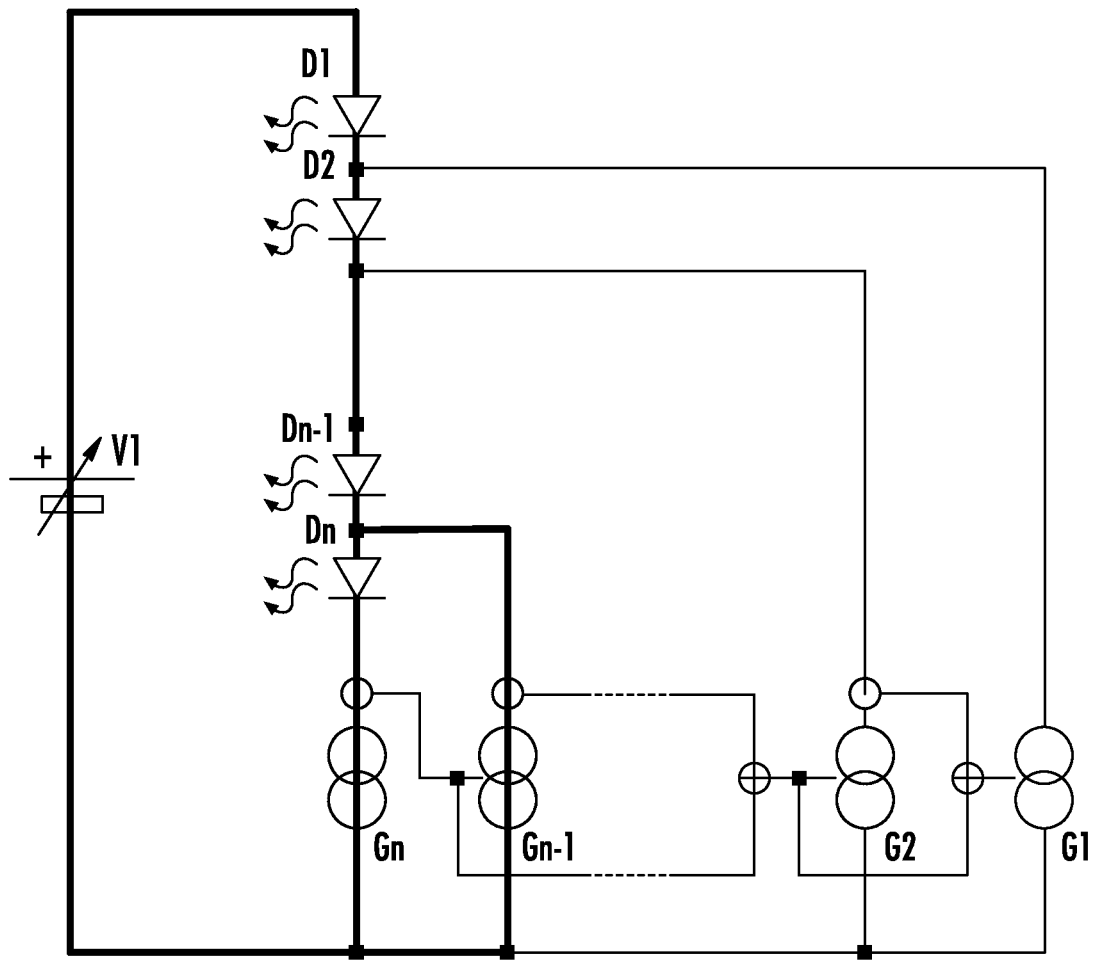
Figure 3F:
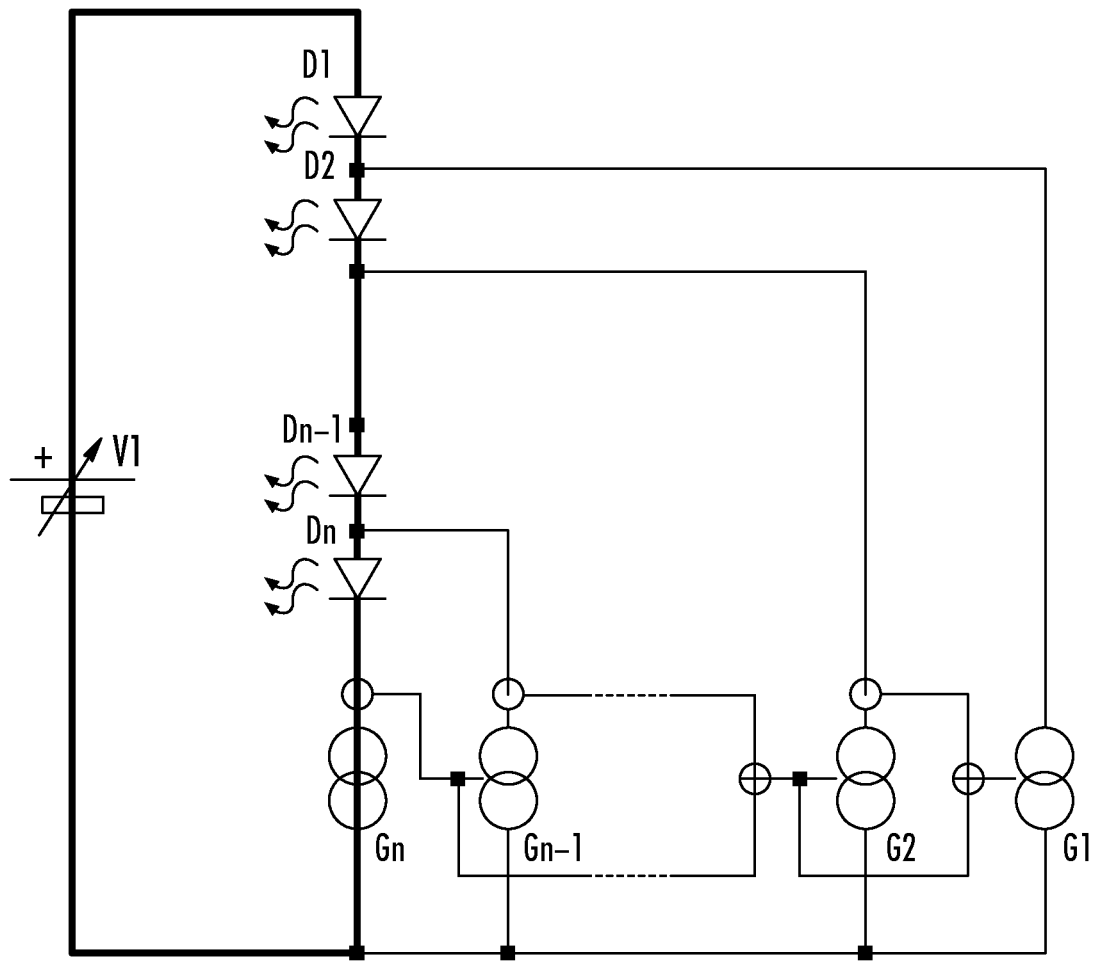

FIG. 3D shows the current path in the circuit when V1 has been increased to the point at which current source Gn−1 regulates the current through LED arrays D1 to Dn−1. Further increasing V1 causes LED array Dn to conduct, as shown in FIG. 3E. FIG. 3F shows the current path when the current through LED array Dn is increased to trigger current sources G1 to Gn−1 to be in the open condition.

As would be understood by one of ordinary skill in the art, the switching sequence shown in FIGS. 3A-3F would be reversed if the voltage of V1 is declining. In particular, the situation in which the voltage of V1 is high enough to pass a regulated current through LED arrays D1 to Dn and current source Gn is shown in FIG. 3F. As V1 is decreased, the current through Gn starts to decrease and to a point below the threshold value, current source Gn−1 is enabled and current begins to flow through current source Gn−1 as shown in FIG. 3E. When V1 decreases to a value below the sum of forward voltage sum of LED arrays D1 to Dn, current through LED array Dn is stopped, as shown in FIG. 3D.

Figure 4:
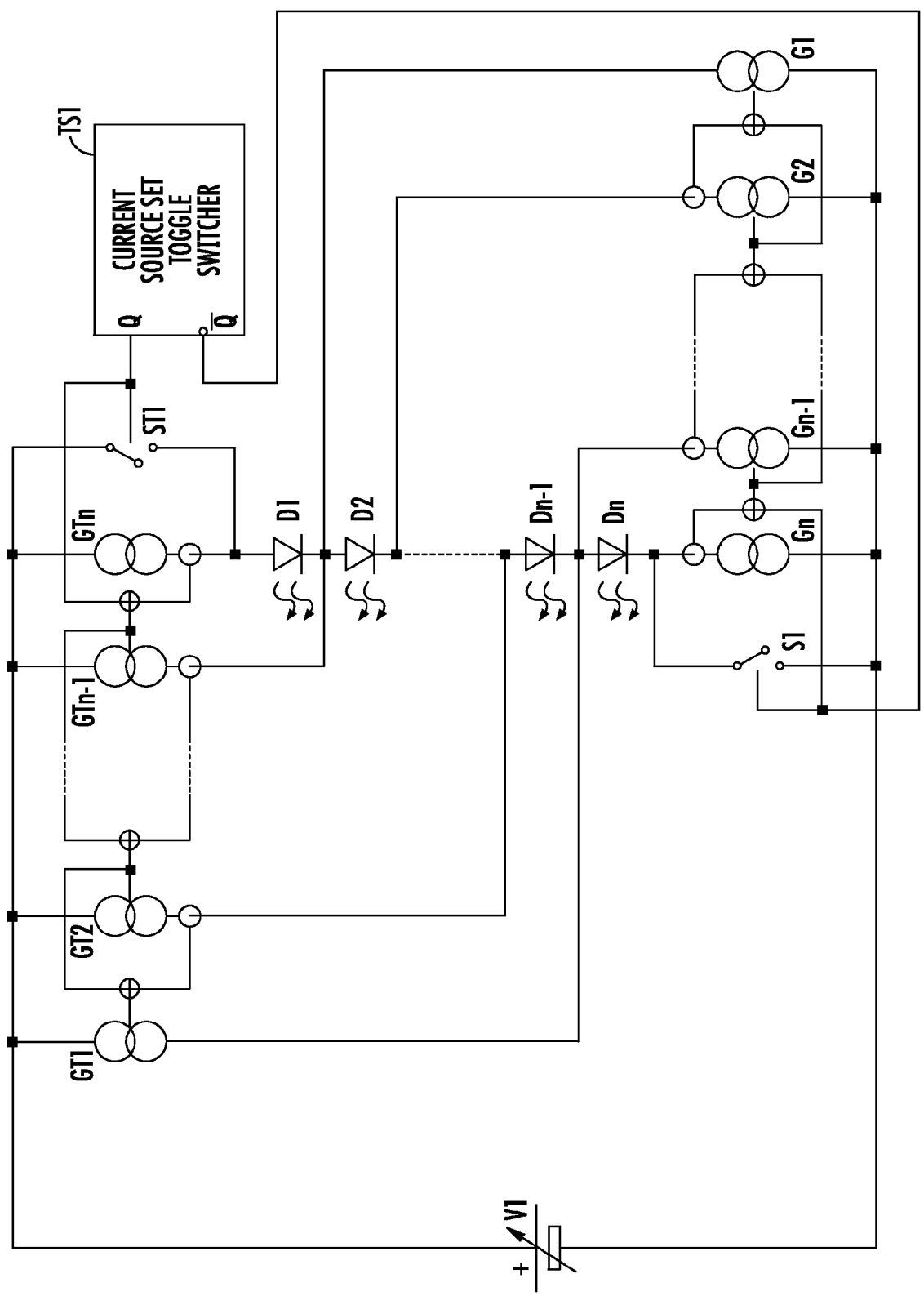
FIG. 4 is a functional block diagram of the circuit of FIG. 2 with an optional set of current sources for averaging of the usage among the LEDs, in accordance with an aspect of the present invention.

As can be seen from the foregoing description, in the circuit of FIG. 2, LED array D1 conducts if any one of the current sources is conducting. On the other hand, LED array Dn only conducts if current source Gn is conducting. Thus, in operation, LED array D1 would be used more often than LED array Dn. FIG. 4 is a block diagram of a circuit that averages the usage among LED arrays D1 to Dn. The circuit includes a set of additional current sources GT1-GTn and a current source set toggle switcher TS1 added to the circuit of FIG. 2.

As can be seen in FIG. 4, the current source set toggle switcher TS1 has two complementary signal outputs Q and $\overline{Q}$. Preferably, the toggle switcher TS1 is configured such that these outputs are toggling at frequency above 20 Hz, to avoid the perception of flicker. When Q of the toggle switcher TS1 is active, the switch ST1 connected to this output becomes closed, current sources GT1 to GTn are disabled, and switch S1 is opened. In this condition, the circuit of FIG. 4 is essentially identical to the circuit shown in FIG. 2, and operates as described above upon occurrence of ramping up or down of input voltage V1.

Figure 1:
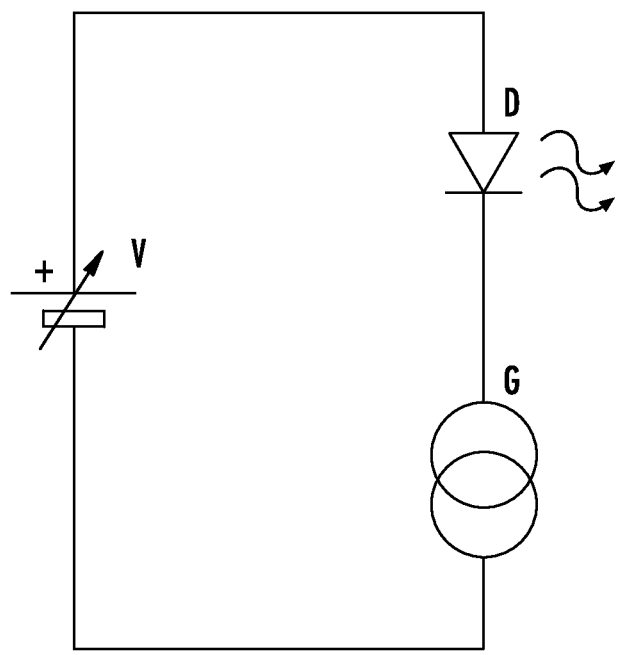
FIG. 1 is a circuit diagram of a conventional LED driving circuit that utilizes a current source.

When $\overline{Q}$ becomes active, and Q becomes non-active, switch S1 becomes closed, current sources G1 to Gn are disabled, switch ST1 is opened, and current sources GT1 to GTn are operational. In this situation, if V1 is ramping up from zero voltage, unlike in the circuit of FIG. 1, Dn will be the first conducting array followed by Dn−1, just the opposite of what occurs in the circuit of FIG. 2. Thus, over time, the usage of the LEDs will average out.

Figure 5:
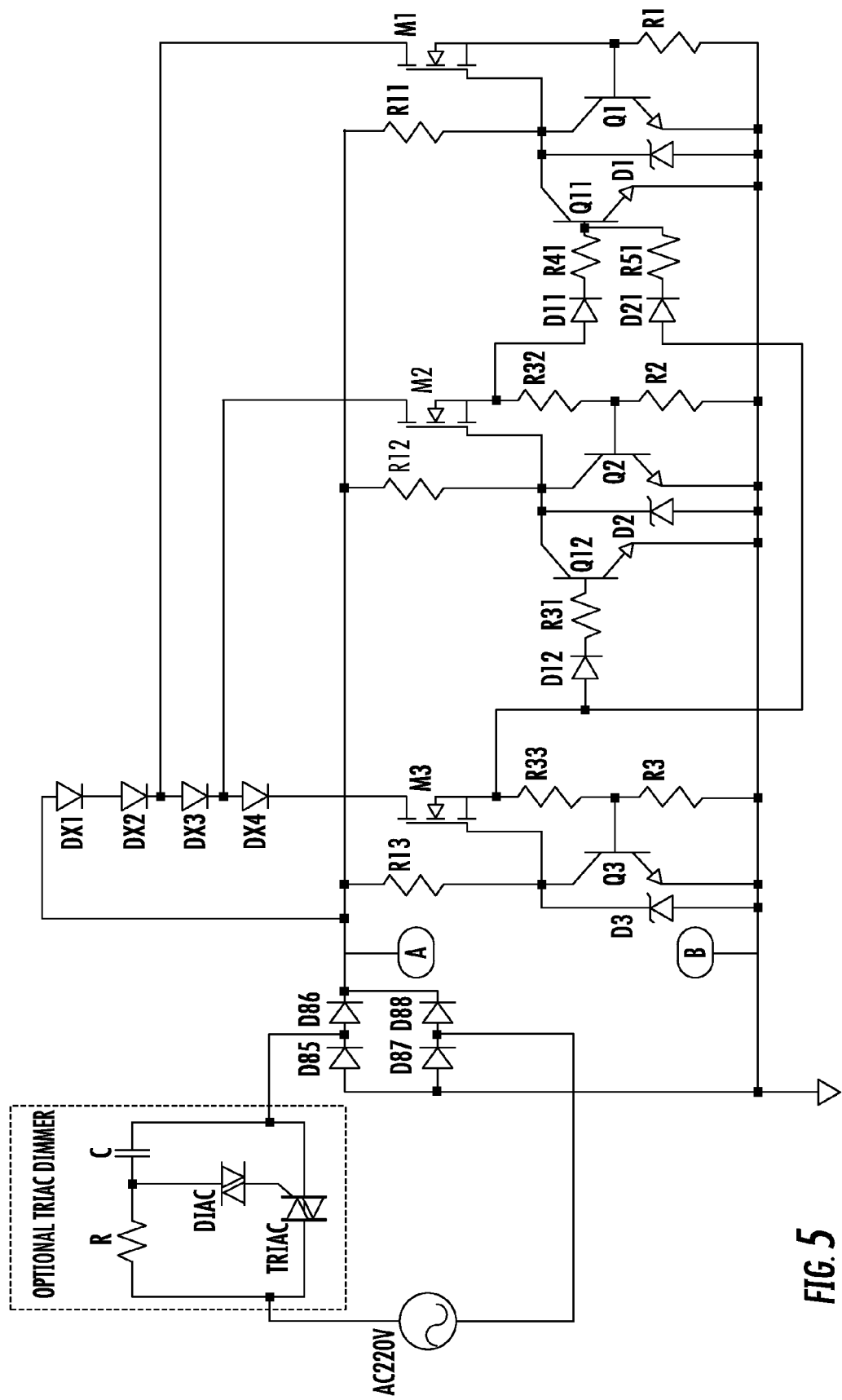
FIG. 5 is a circuit diagram showing a practical implementation of the circuit shown in FIG. 2.
Figure 6:
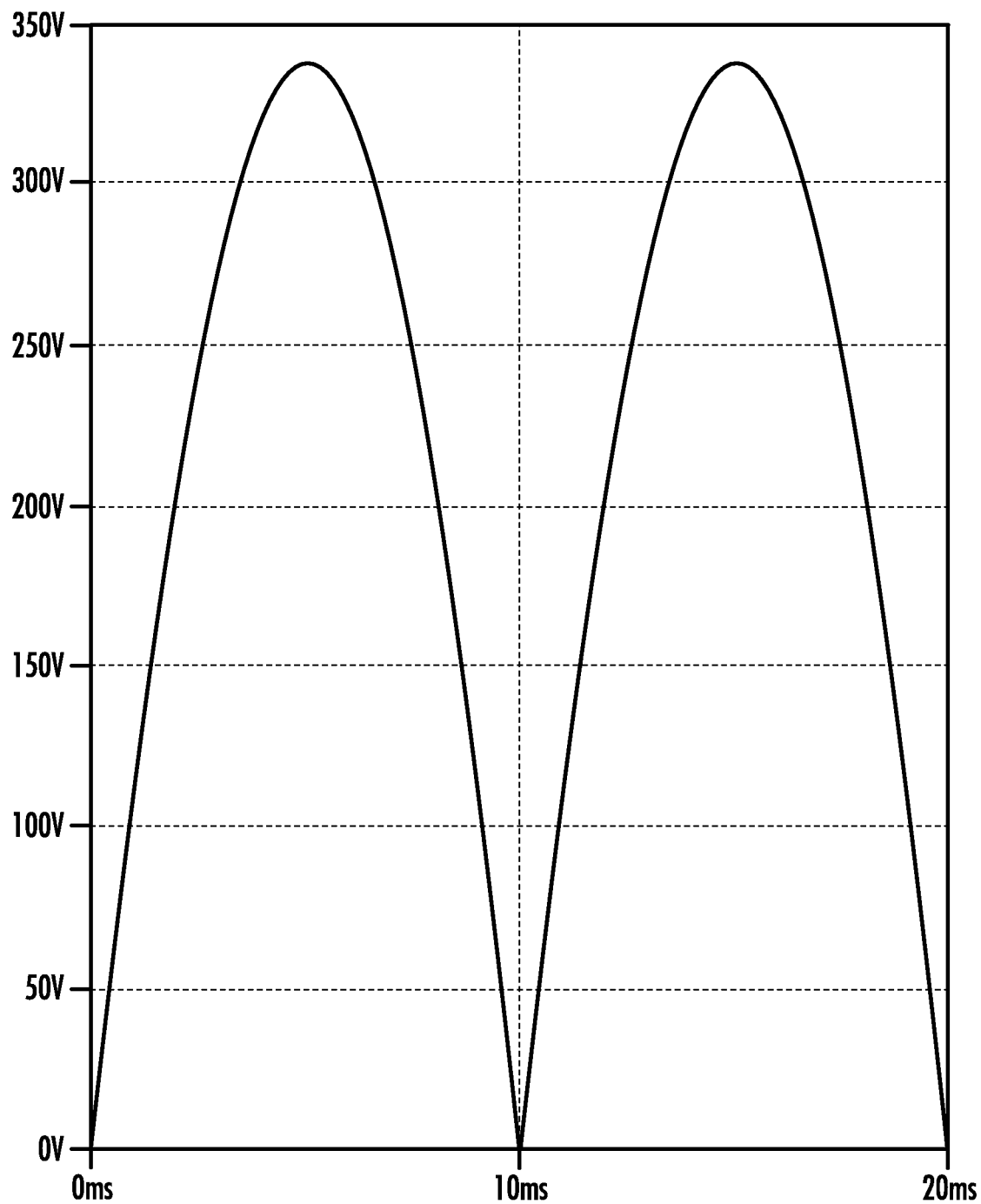
FIG. 6 is a diagram of the voltage waveform across nodes A and B in FIG. 5.

FIG. 5 shows a practical detailed implementation of the proposed circuit shown in FIG. 2 with n=3. In the figure, the AC 220V main voltage source is a rectified signal. The voltage waveform across node A and B is shown in FIG. 6. The LED string, consists of four LEDs DX1-DX4, with forward voltage of 50V each, and is divided into 3 arrays. The first array has 2 LEDs (DX1 and DX2) while the second and third arrays, each have a single LED (DX3 and DX4, respectively).

As can be seen in the figure, transistor M1, resistors R1 and R11, transistor Q1 and diode D1 form a current source that drives LEDs DX1 and DX2. Transistor Q11 turns off transistor M1 when the current through transistor M2 reaches threshold value.

Figure 7:
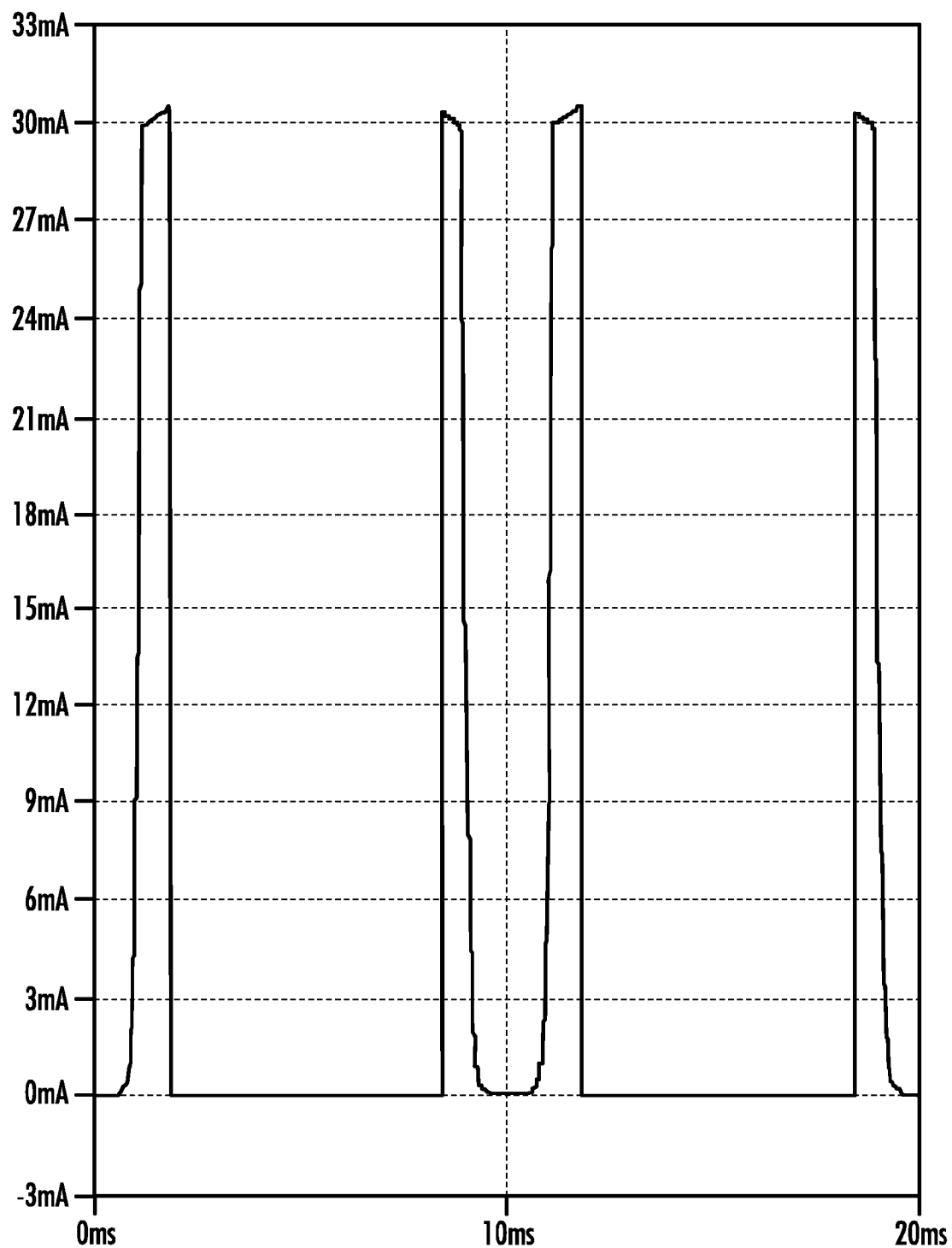
FIG. 7 is a diagram of the current through element M1 in FIG. 5.
Figure 8:
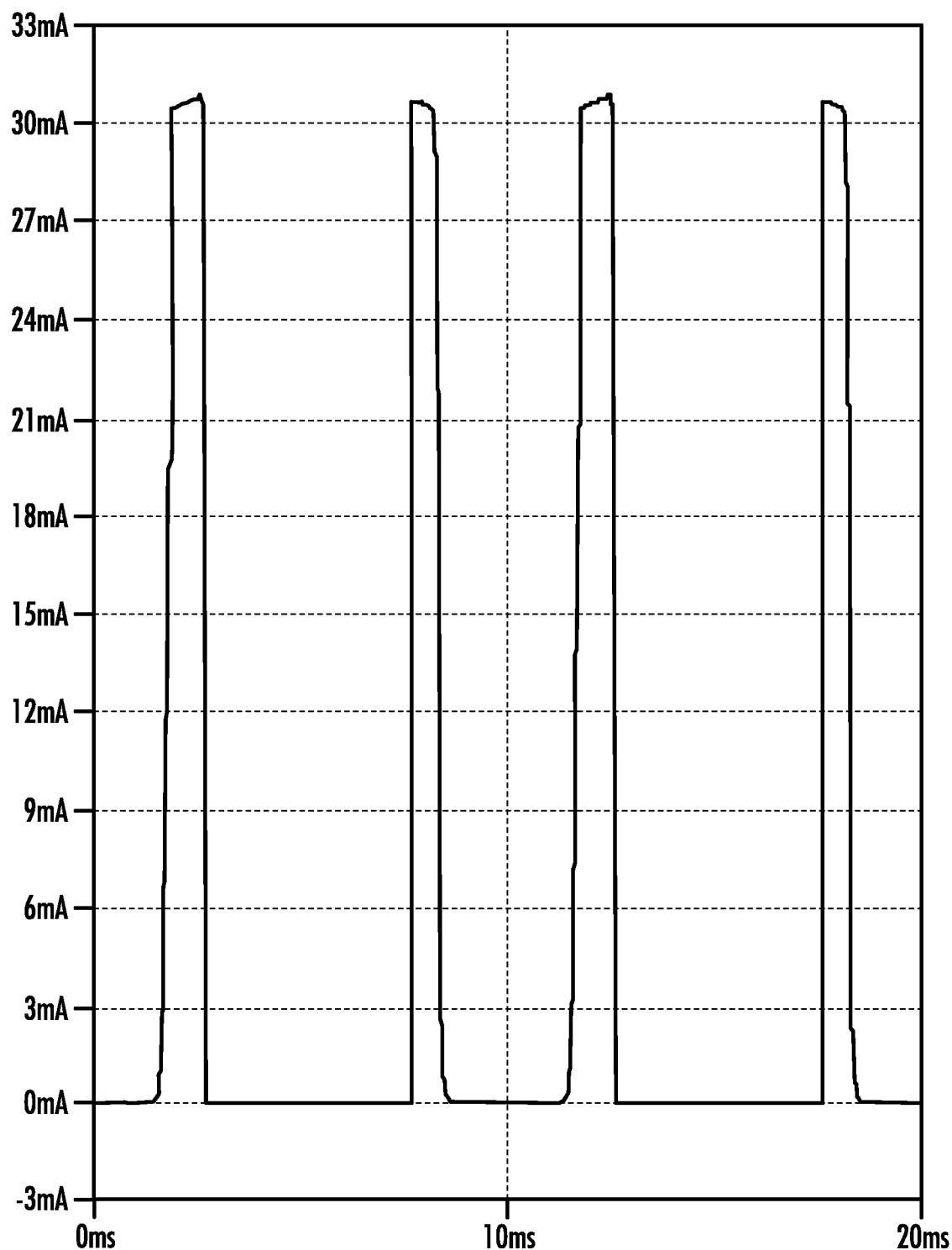
FIG. 8 is a diagram of the current through element M2 in FIG. 5.
Figure 9:
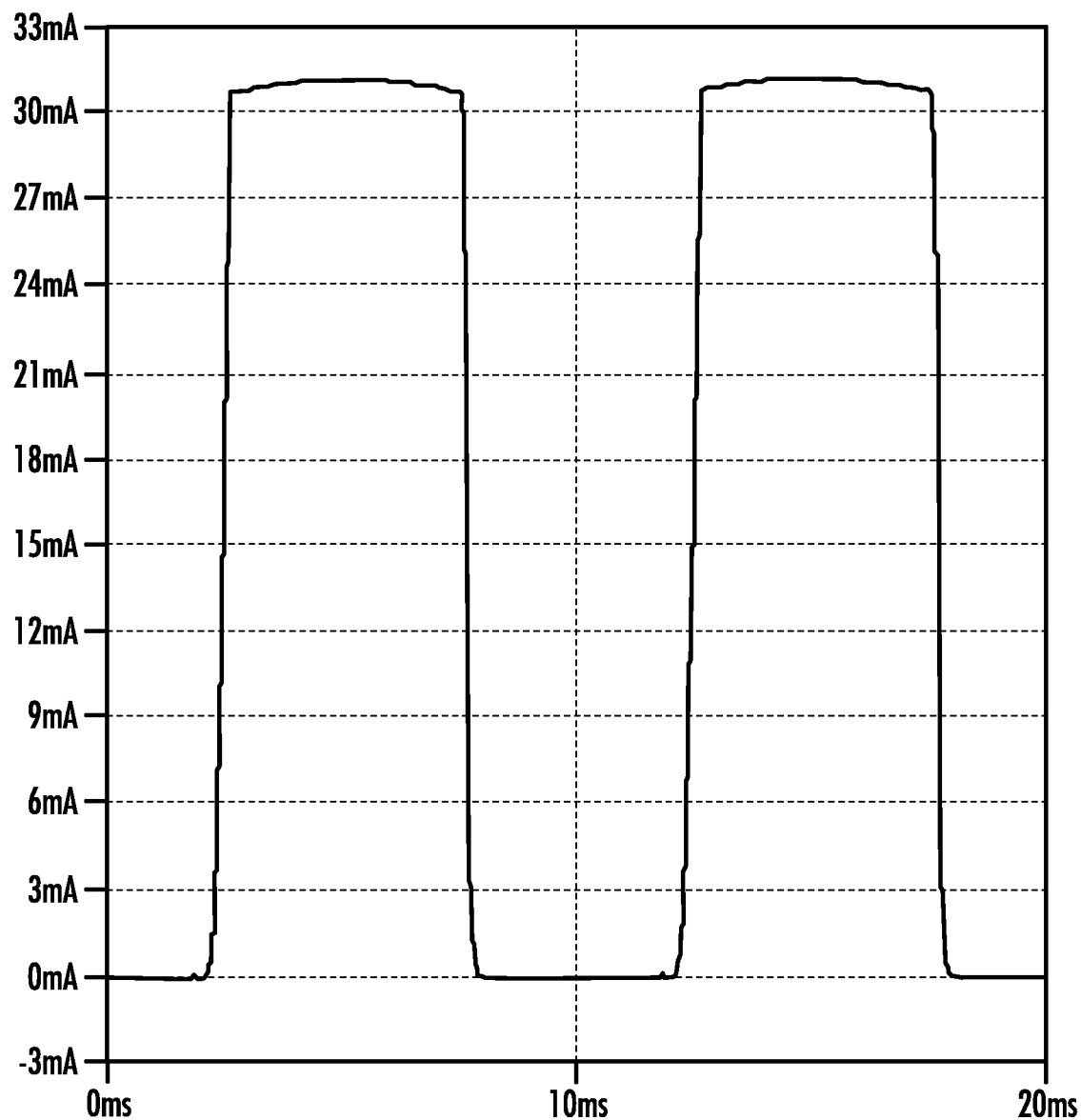
FIG. 9 is a diagram of the current through element M3 in FIG. 5.
Figure 10:
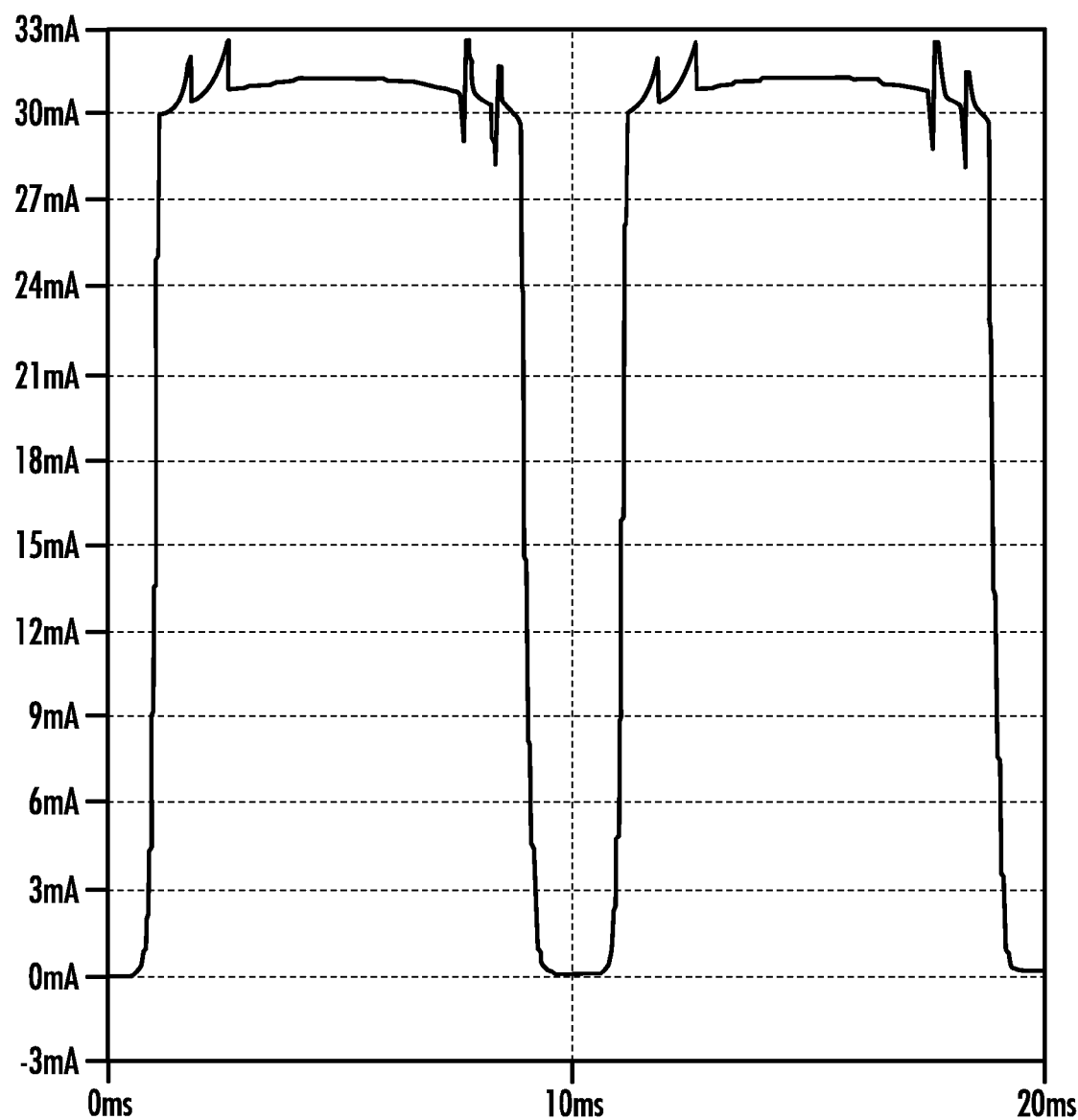
FIG. 10 is a diagram of the current through element DX1 in FIG. 5.
Figure 11:
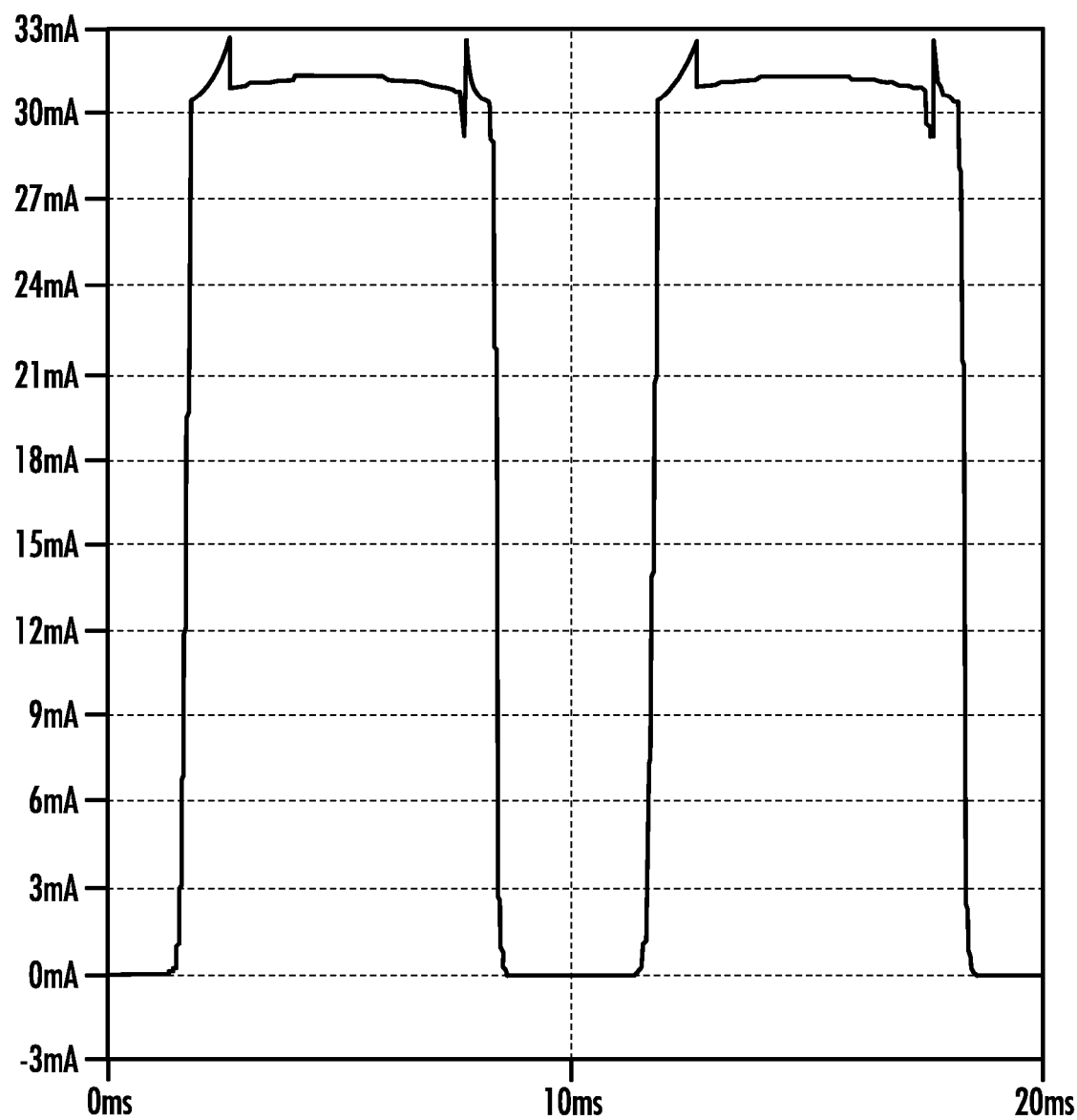
FIG. 11 is a diagram of the current through element DX3 in FIG. 5.
Figure 12:
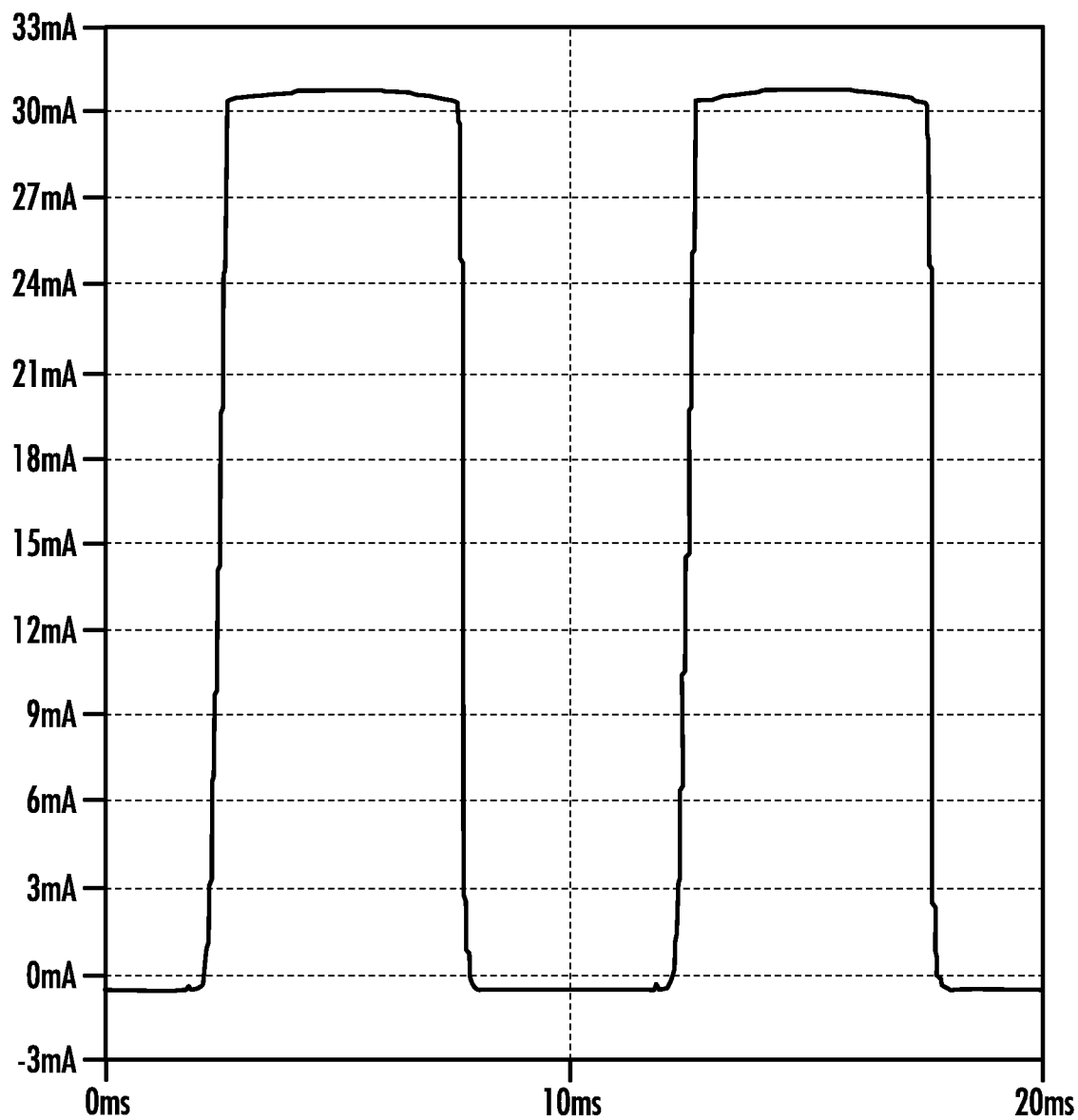
FIG. 12 is a diagram of the current through element DX4 in FIG. 5.
Figure 13:
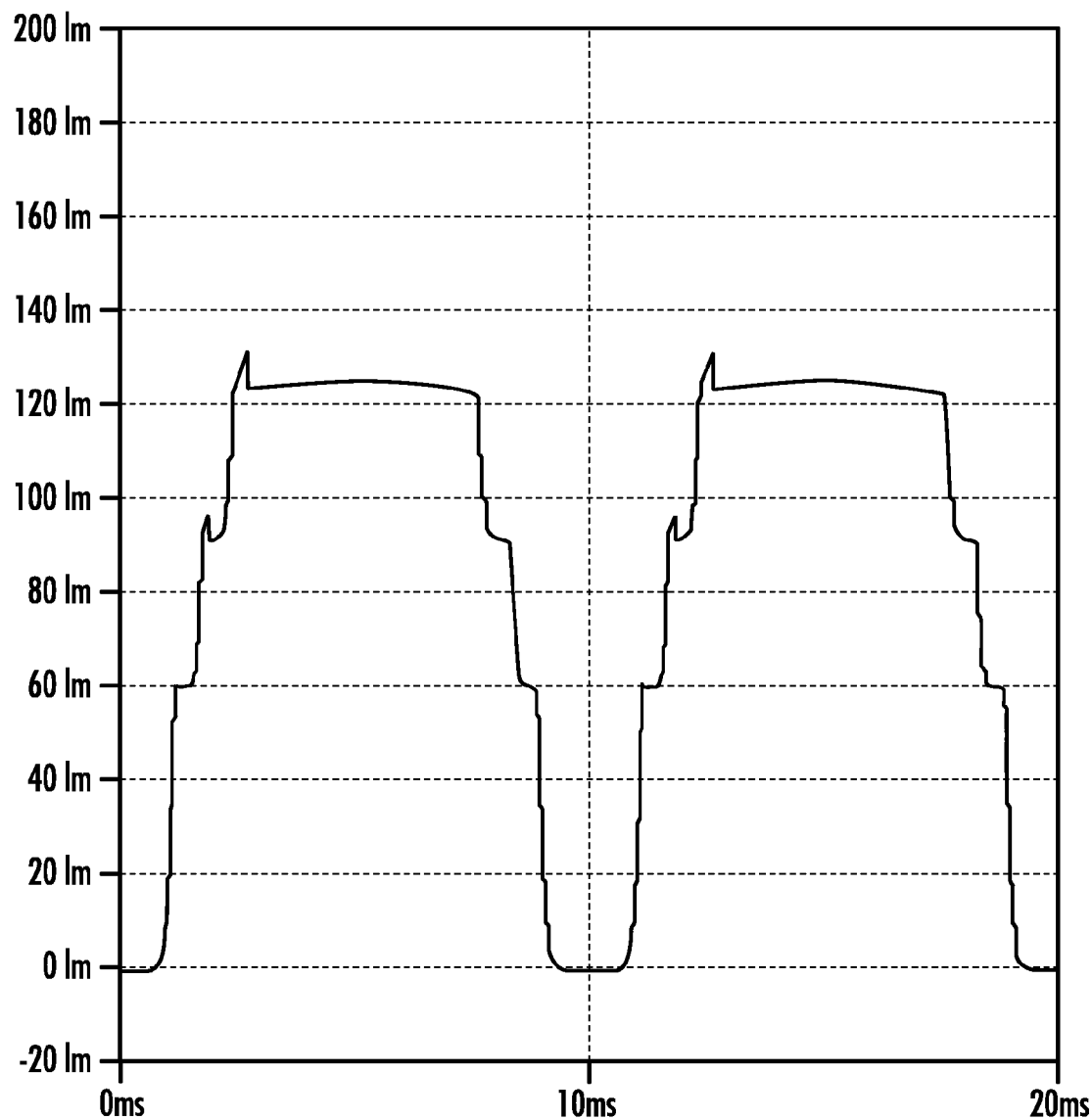
FIG. 13 is a diagram of the light output waveform of the circuit in FIG. 5.

FIG. 7 shows the current waveform of transistor M1. Waveforms corresponding to the current in transistors M2 and M3 are shown in FIGS. 8 and 9, respectively. FIGS. 10, 11 and 12 show the current waveforms of LEDs DX1, DX3 and DX4 respectively. The current of LED DX1 is the current sum of transistors M1, M2 and M3, while the current of LED DX3 is the current sum of transistors M2 and M3. FIG. 13 shows the light output waveform of all the LED arrays.

Figure 14:
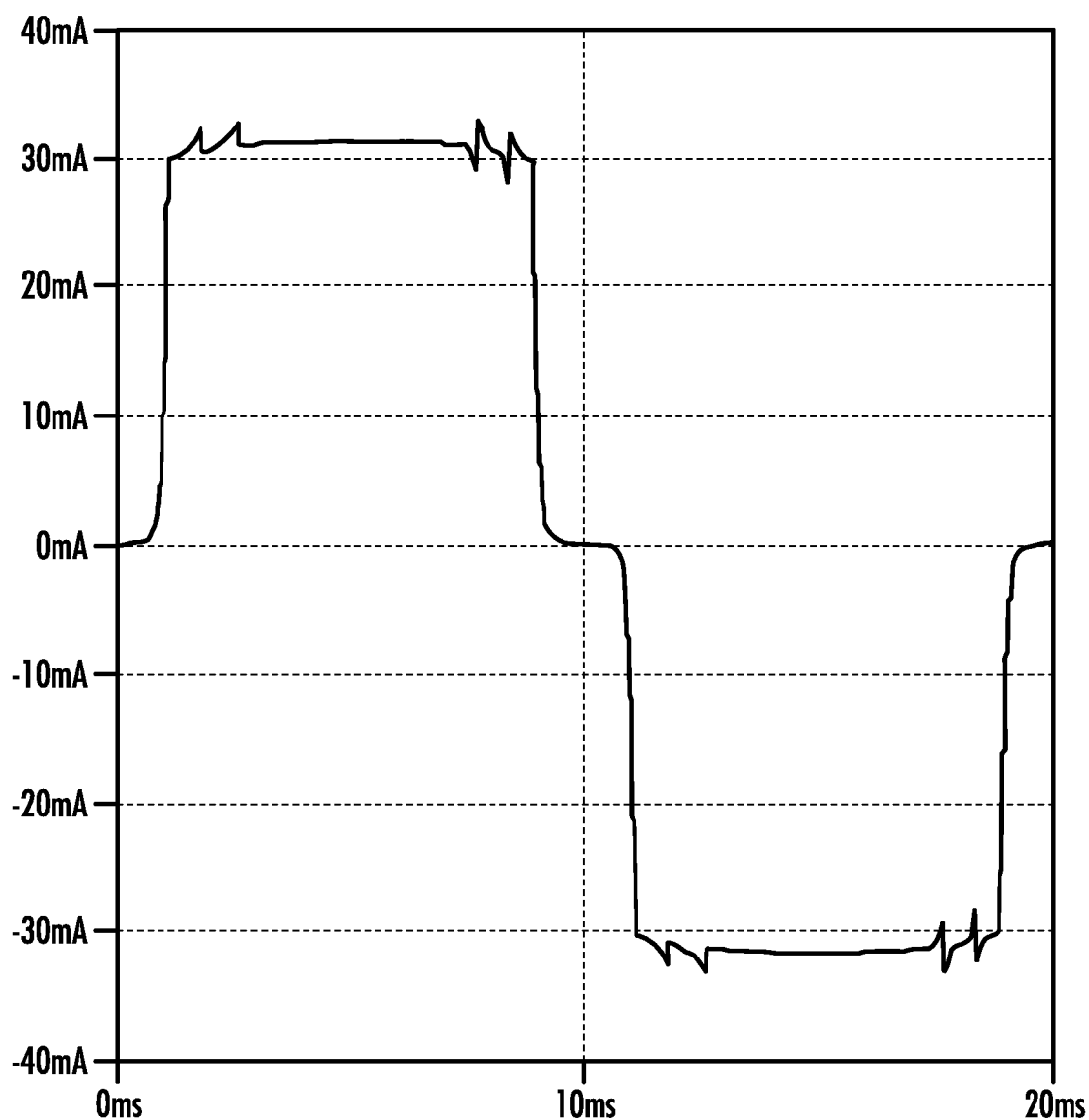
FIG. 14 is a diagram showing the input waveform at the AC main source in FIG. 5.
Figure 15:
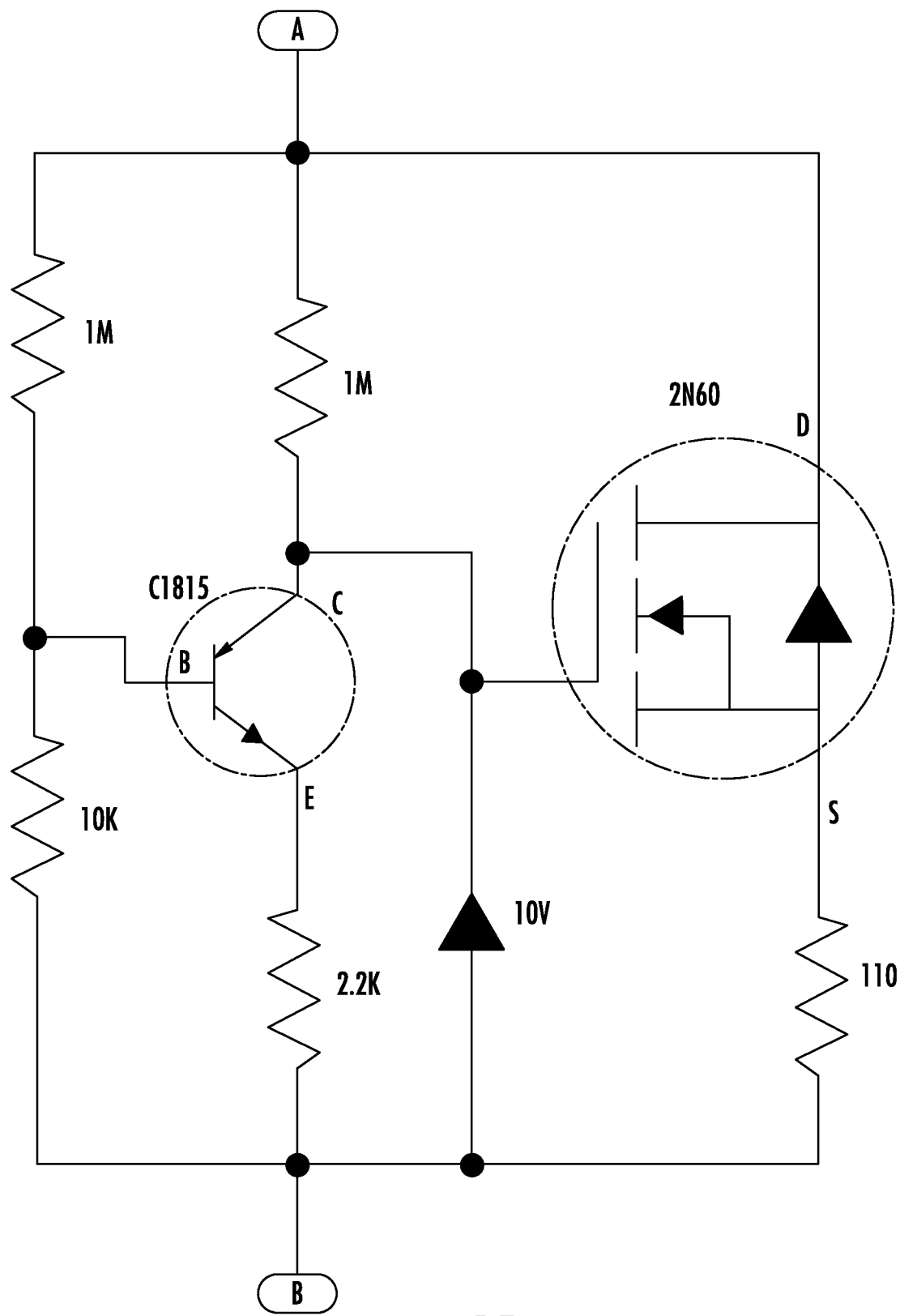
FIG. 15 is a circuit of a bleeder circuit that can be used with the circuit of FIG. 5.

FIG. 14 shows the input current waveform from AC main power source. Throughout most of the half line cycle, the current is continuous, which makes the circuit suitable to work with an optional triac dimmer, shown in FIG. 5. An optional bleeder circuit can be added to provide a current path for the triac dimmer's RC timing circuit when the triac is off. FIG. 15 shows a form of bleeder circuit which connects to node A and B of FIG. 5. The bleeder circuit acts like a resistive load for the dimmer when the triac is not conducting. A bypass resistor 110 is switched on by transistor 2N60 to connect across the rectified input voltage when the rectified input voltage is low (which indicates the triac is off). With the bypass resistor completing the circuit, sufficient charging current can be supplied to the internal RC timing circuit of the triac dimmer to ensure proper operation. When the rectified input voltage is high (which indicates the triac is on), the bypass resistor is disconnected by transistor 2N60 to minimize wasteful power dissipation.

Figure 16:
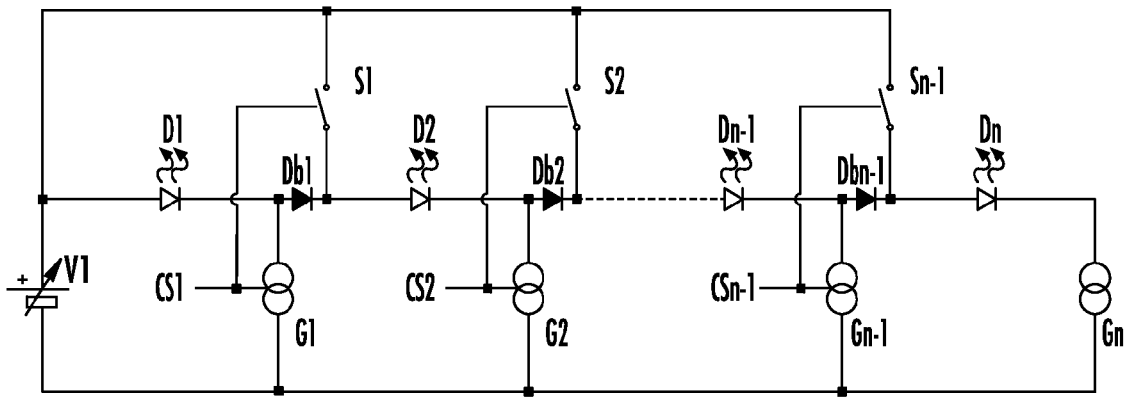
FIG. 16 is functional block diagram of a circuit for LED array switching in accordance with a second embodiment of the present invention.

In the first embodiment at low levels of input voltage, only the first and second arrays D1 and D2 conduct. This condition results in a lowered light output current waveform during low levels of input voltage, as can be seen in FIG. 13 discussed above. A second embodiment of an LED switching apparatus is described with reference to FIGS. 16-34. The second embodiment provides a time period at low input voltage in which all of the LED arrays conduct current, in parallel branches, which alleviates the abovementioned problem shown in FIG. 13. FIG. 16 shows the functional blocks of a circuit for LED switching in accordance with the second embodiment.

In the circuit shown in FIG. 16, V1 is a varying DC voltage source. D1 to Dn are LED arrays, each of which can be more than one LED, formed in series or parallel or combinations of serial and parallel. G1 to Gn are current sources. S1 to Sn are switches. Db1 to Dbn are diodes. Each single diode Dbi, where i can be 1 to n, functions to prevent current through switch Si to current source Gi when switch Si is switched on. Control signal CSi is used to select either conducting state or open circuit state of both switch Si and current source Gi.

When CS1 to CSn are not activated, switches S1 to Sn−1 are off and current sources G1 to Gn−1 are in open circuit condition. All LED arrays D1 to Dn are series connected through diodes Db1 to Dbn and current is controlled by current source Gn. In this situation, if V1 is lower than the total forward voltage of D1 to Dn, the LED arrays will not be lit. However, in accordance with the disclosed embodiment, this low voltage condition can be sensed, for example by a controller that can perform voltage comparison, and the controller can then preferably apply one or more of the control signals to break the serial path into parallel paths, each having a lower forward voltage arrangement than V1, allowing the LEDs in the parallel paths to be lit even when the voltage is low.

For example, when a single control signal CSi is activated, Gi is conducting and current through LED arrays D1 to Di will be controlled by Gi. Also, switch Si is conducting and current is directly supplied from V1 to LED arrays Di+1 to Dn. In this case, two parallel connected current paths are formed, i.e., current path from D1 to Di which is controlled by Gi and current path from Di+1 to Dn which is controlled by Gn. If a further control signal CSj is activated, where j>i, the circuit will change into three parallel connected current paths of D1 to Di, Di+1 to Dj, and Dj+1 to Dn which are controlled by Gi, Gj and Gn respectively.

When all control signals CS1 to CSn are activated, all LED arrays D1 to Dn will be parallel connected to V1 through current sources G1 to Gn respectively. The creation of the different parallel paths permits the LEDs to be lit even when the input voltage V1 is low. For example, to allow for the lighting of LED arrays even at low input voltage V1, the activation of the control signals can be controlled such that for the lowest input voltage, the greatest number of parallel paths is formed, each path having a forward voltage that can be lit by the present input voltage. As the input voltage V1 increases, a smaller number of parallel paths can be formed by application of control signals as described above, each path having more LED arrays, until, above a certain voltage, e.g., a voltage greater than or equal to the forward voltage of LED arrays D1 to Dn, a single string of LED arrays D1 to Dn is formed, which in the above example, would be when no control signals are activated.

Figure 17:
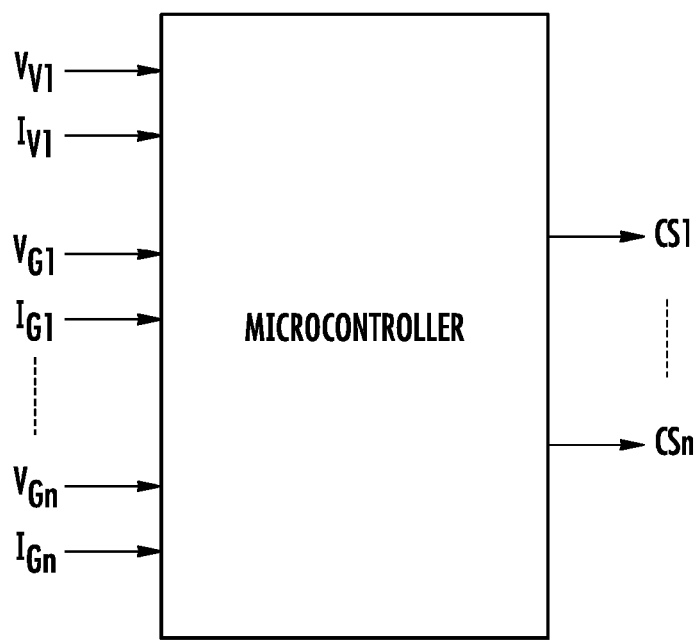
FIG. 17 is functional block diagram showing how a microcontroller can be used with the circuit of FIG. 16.

The control signals can be generated by voltage comparators which compares the voltage of V1 to certain threshold voltage or current sensors which sense the currents through the current sources. More sophisticated control can be implemented with the use of a microcontroller. FIG. 17 shows the functional block diagram of a microcontroller that can be used with the circuit of FIG. 16. In FIG. 17, $V_{V1}$ and $I_{V1}$ denote the voltage across V1 and the current through V1 respectively. $V_{Gi}$ and $I_{Gi}$ denote the voltage across Gi and the current through Gi respectively. The microcontroller preferably samples and processes the various voltage/current signals and generates control signals CS1 to CSn according to algorithms that are designed to optimize efficiency, input power quality, LED arrays usage and light output uniformity, etc.

For example, a simple example of such an algorithm is to keep the voltage difference between V1 and the forward voltage of combined LED arrays small in order to maximize efficiency. It is assumed the forward voltages of all LED arrays D1 to Dn are equal to same value Vd and maximum of V1 is higher than the forward voltage sum of D1 to Dn, i.e. nVd. When V1<2Vd, all control signals are activated and D1 to Dn are parallel connected through G1 to Gn respectively. When 2Vd≤V1<3Vd, only control signals CSi are activated where i is even and i≤n. When 3Vd≤V1<4Vd, only control signals CSi are activated where i is multiple of 3 and i≤n. When jVd≤V1<(j+1)Vd, only control signals CSi are activated where i is multiple of j and i≤n. When nVd≤V1, all control signals are de-activated and D1 to Dn are connected in series through current source Gn. This is only one example and the invention is not limited to this exemplary embodiment.

Also, the microcontroller can be programmed to have fault handling ability, e.g., the microcontroller can detect any faulted LED array and re-arrange the switching sequence to exclude the faulted LED array. For example, the microcontroller can be programmed so that if Di has a short circuit fault, control signal CSi−1 will be permanently de-activated so that Di−1 and Di can be considered as a single array. If Di has an open circuit fault, current will no longer flow through Di and control signal CSi will be permanently activated in order to have current supplied from V1 to Di+1

Figure 18:
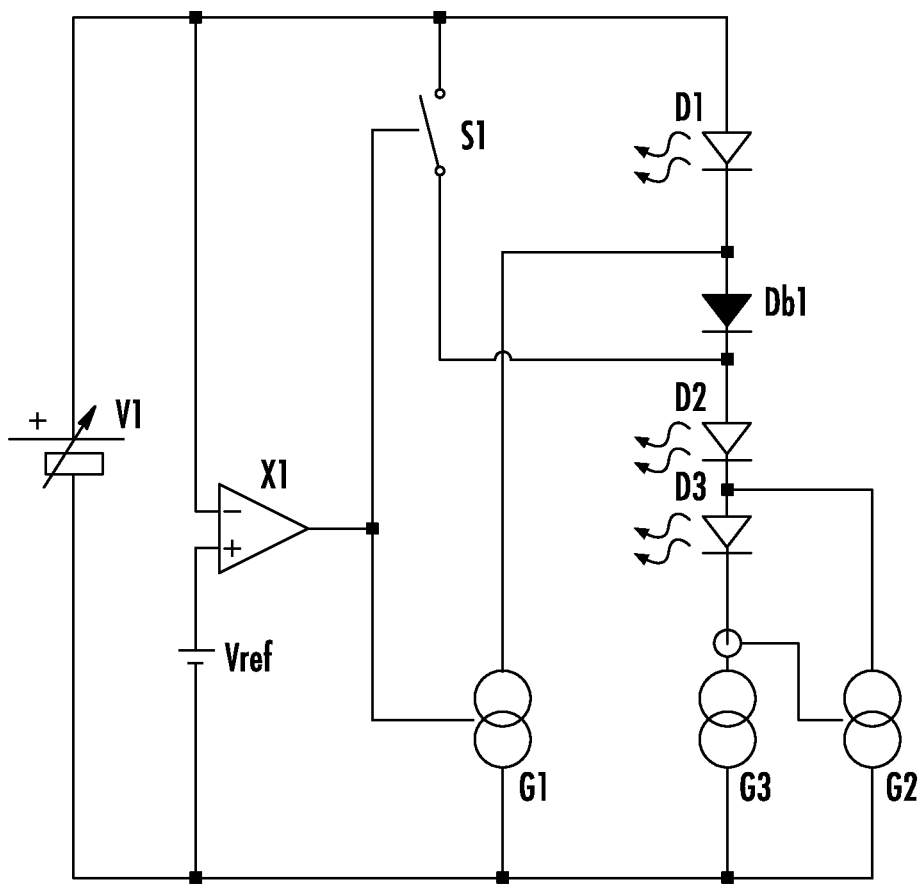
FIG. 18 is functional block diagram of an example circuit for LED array switching in accordance with the second embodiment of the present invention.

FIG. 18 shows an example circuit of control signals generated by voltage comparator and current sensor. In the circuit, current source G1 and switch Si are controlled by voltage comparator X1. Current source G2 can be disabled by current sense signal from current source G3. A reference voltage source, Vref, is coupled to the voltage comparator X1. It should be noted that in this exemplary circuit D2 and D3 are directly connected in series without any diode in between. It is because only two parallel current branches (D1 and D2+D3) are needed in this example and thus there is no need for connecting a switch and a blocking diode to the anode of D3.

Figure 19A:
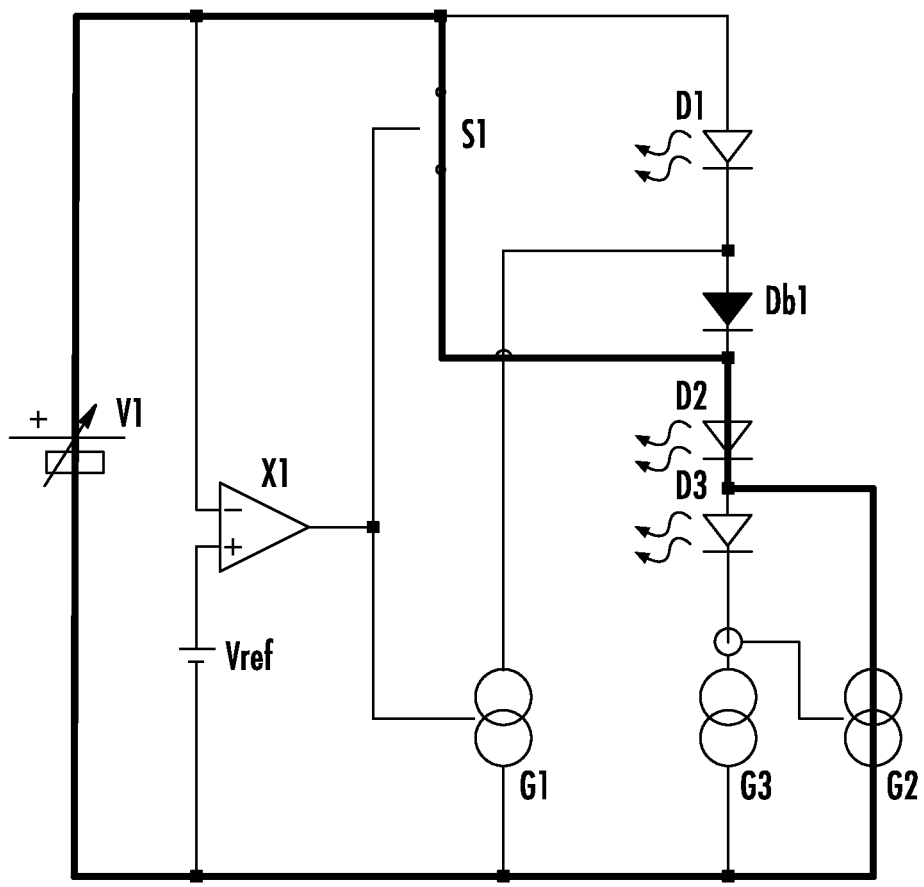
FIGS. 19A-19G are diagrams illustrating current paths taken through the circuit of FIG. 18 at different voltages levels of the source voltage, in accordance with the second embodiment of the present invention.

For explanation purposes, it is assumed that the forward voltage of LED array D1 is larger than the forward voltage sum of D2 and D3, however this is not required. The operation of the circuit shown in FIG. 18 is next shown for the case in which the voltage of V1 is ramping up from zero. While the voltage of V1 is less than the reference voltage Vref, comparator X1 outputs an active signal which enables both current source G1 and switch S1. When the voltage of voltage source V1 is just above the forward voltage of D2, current begins to flow through switch S1, LED array D2 and current source G2 as shown in FIG. 19A. Current source G2 regulates the current through LED array D2 as voltage of V1 is further increased.

Figure 19B:
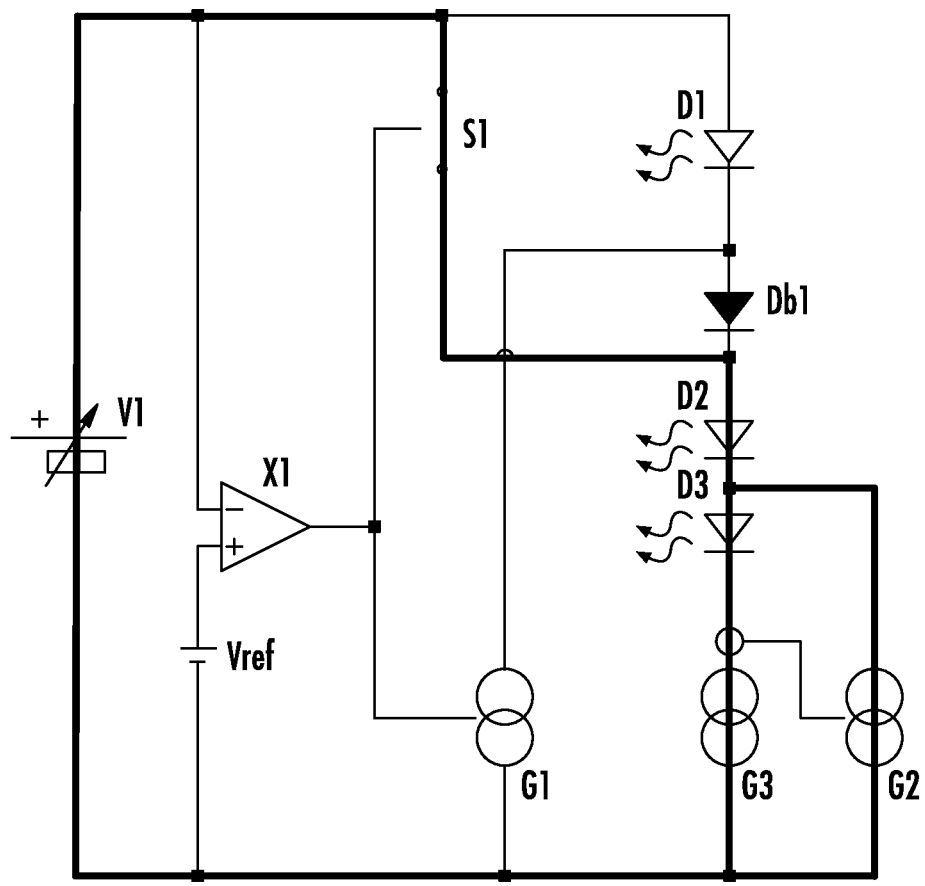
Figure 19C:
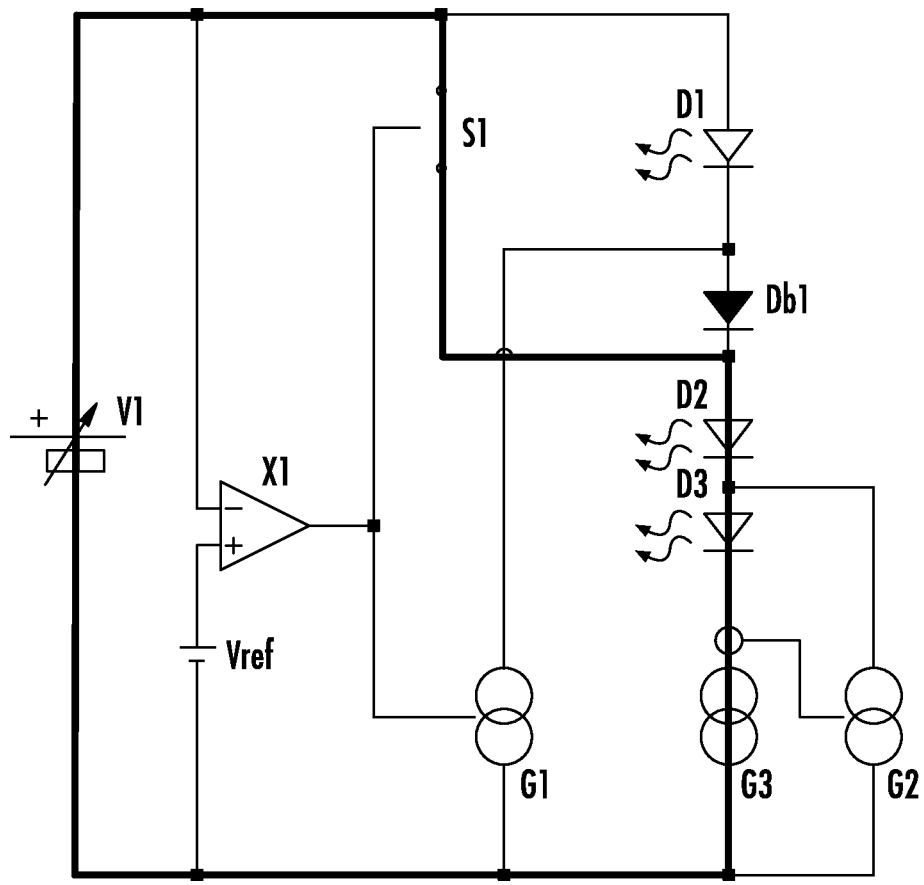
Figure 19D:
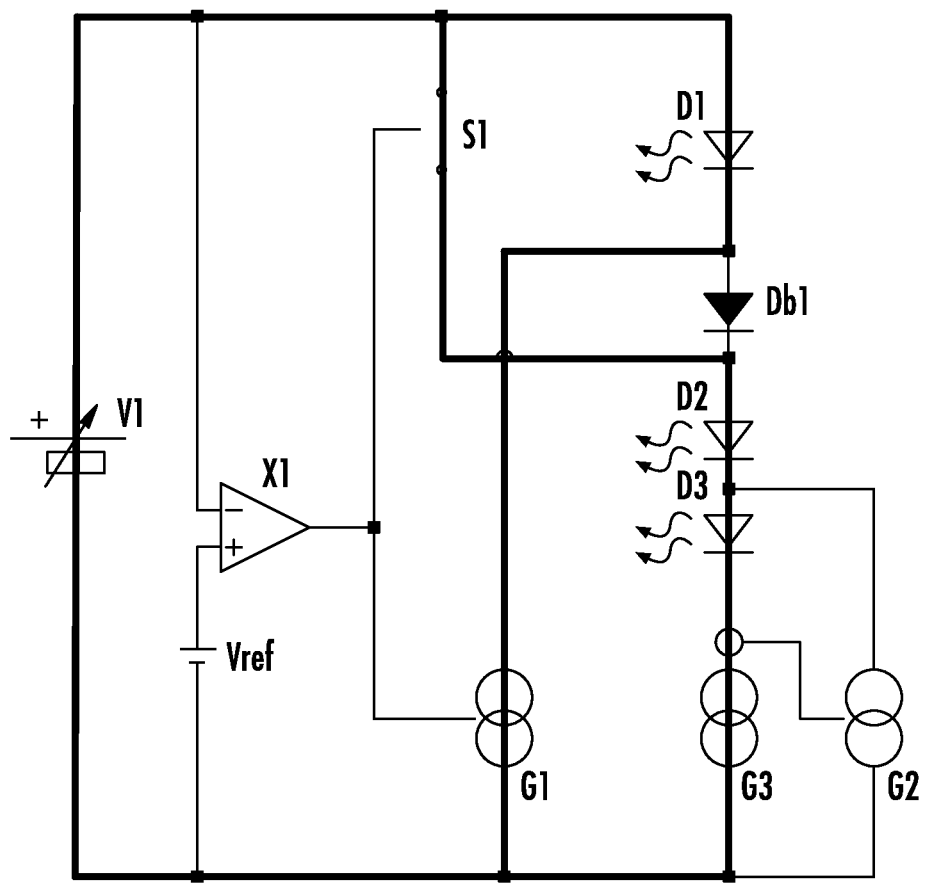

LED array D3 begins to conduct through current source G3 when V1 reaches the sum of the forward voltages of LED arrays D2 and D3, as shown in FIG. 19B. As the current through LED array D3 and current source G3 is increasing to a threshold value, preferably lower than the regulating value of current source G3, current source G2 is disabled, as shown in FIG. 19C. LED array D1 begins to conduct through current source G1 as V1 gets higher to the forward voltage of D1, as shown in FIG. 19D.

Figure 19E:
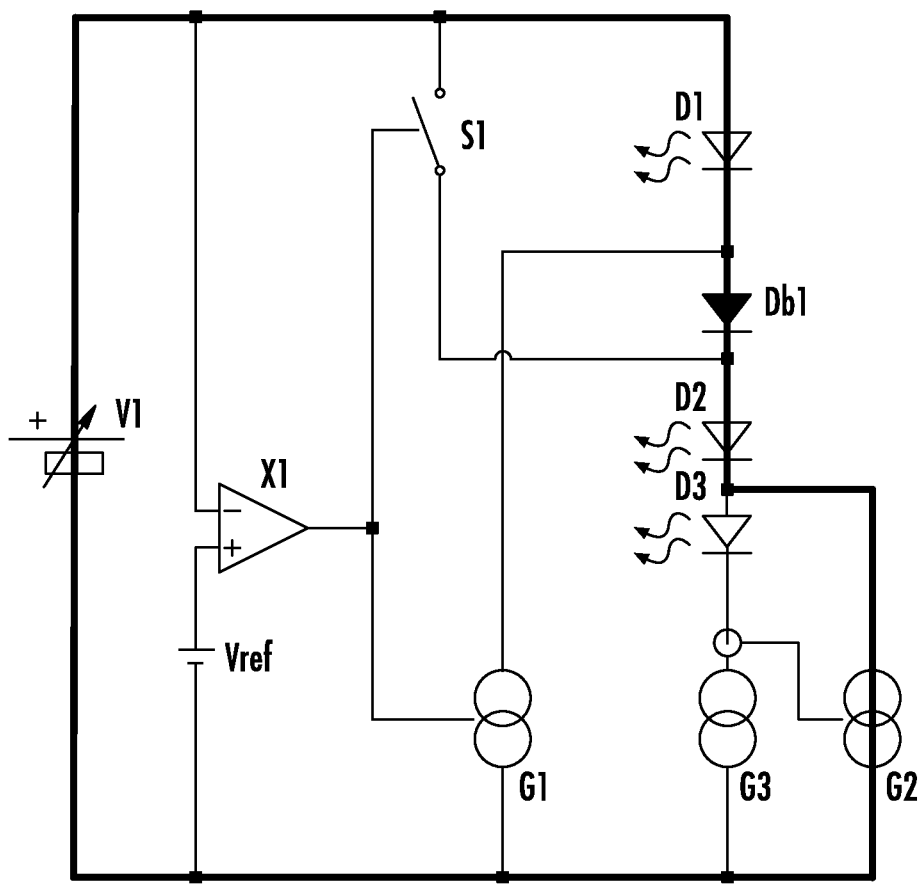
Figure 19F:
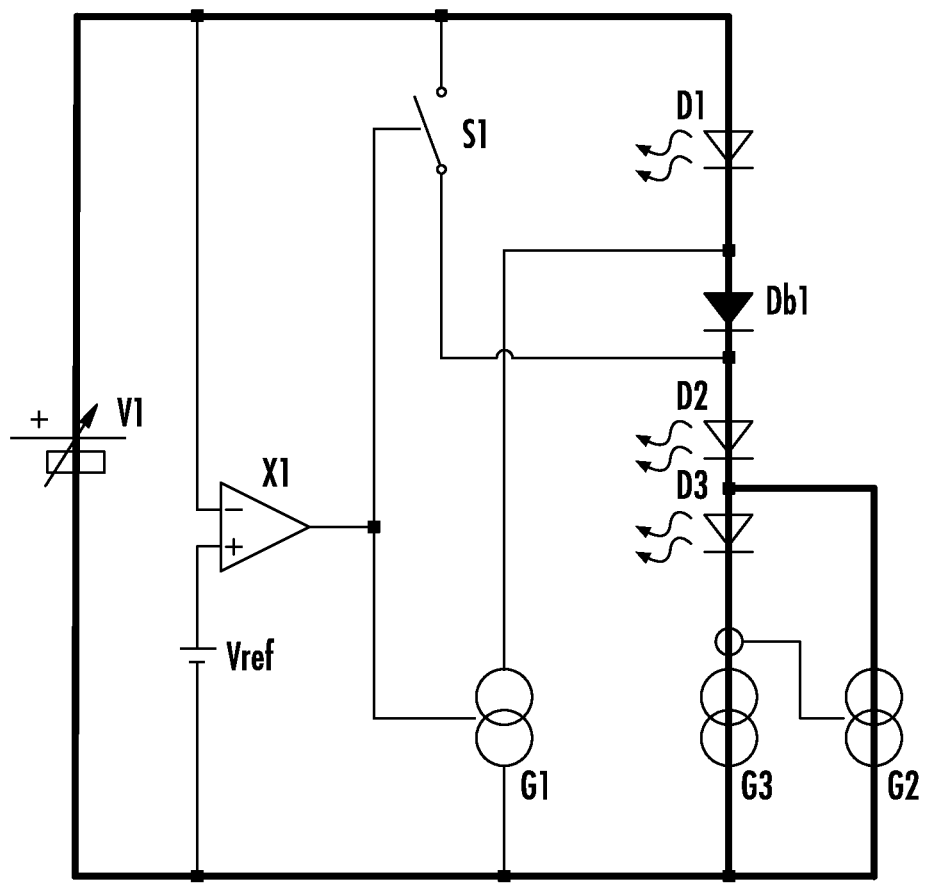
Figure 19G:
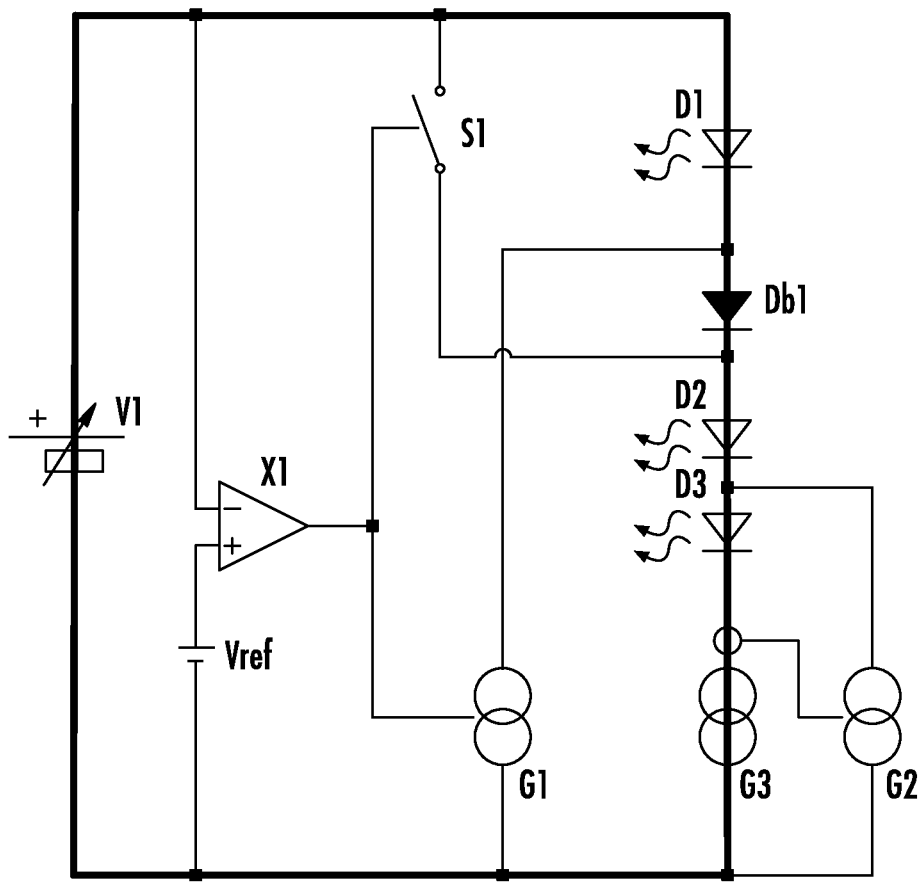

It is preferable to set Vref to be slightly larger than the sum of forward voltages of LED arrays D1 and D2. FIG. 19E shows the current path when V1 is increased to Vref or above. In this case, switch S1 and current source G1 are set to an open circuit condition by voltage comparator X1. Current flows through LED array D1, diode Db1 (which prevents back directional current), LED array D2 and current source G2. Further increasing V1 causes LED array D3 to conduct, as shown in FIG. 19F. FIG. 19G shows the current path when the current through LED array D3 is increased to trigger current source G2 to be in the open condition.

As would be understood by one of skill in the art, the switching sequence shown in FIGS. 19A-19G would be reversed if the voltage of V1 is declining. In particular, the situation in which the voltage of V1 is high enough to pass a regulated current through LED arrays D1 to D3 and current source G3 as shown in FIG. 19G. As V1 is decreased the current through current source G3 starts to decrease and to a point below the threshold value, current source G2 is enabled and current begins to flow through current source G2, as shown in FIG. 19F. When V1 decreases to a value below the sum of forward voltage sum of LED arrays D1 to D3, current through LED array D3 is stopped, as shown in FIG. 19E.

As V1 is further decreased to below Vref, switch S1 and current source G1 are enabled to conduct. Current through LED array D1 is regulated by current source G1. Current through LED arrays D2 and D3 is regulated by current source G3. Further decreasing V1 causes current through current source G1 to decrease to zero. When the current through current source G3 is decreased to a point below the threshold value, current source G2 is enabled, as shown in FIG. 19B. When V1 is decreased to below the sum of forward voltages of LED arrays D2 and D3, current can only flow through LED array D2 and current source G2, as shown in FIG. 19A.

As can be seen from the above, the design of the circuit shown in FIG. 18 provides for a period of driving of all of the LED arrays, in parallel, even during the period of time that the voltage of the voltage supply is below Vref. This provides an improvement in the supply of current to the LED arrays and hence light output during low voltage operation as compared with the design of the first embodiment.

Figure 20:
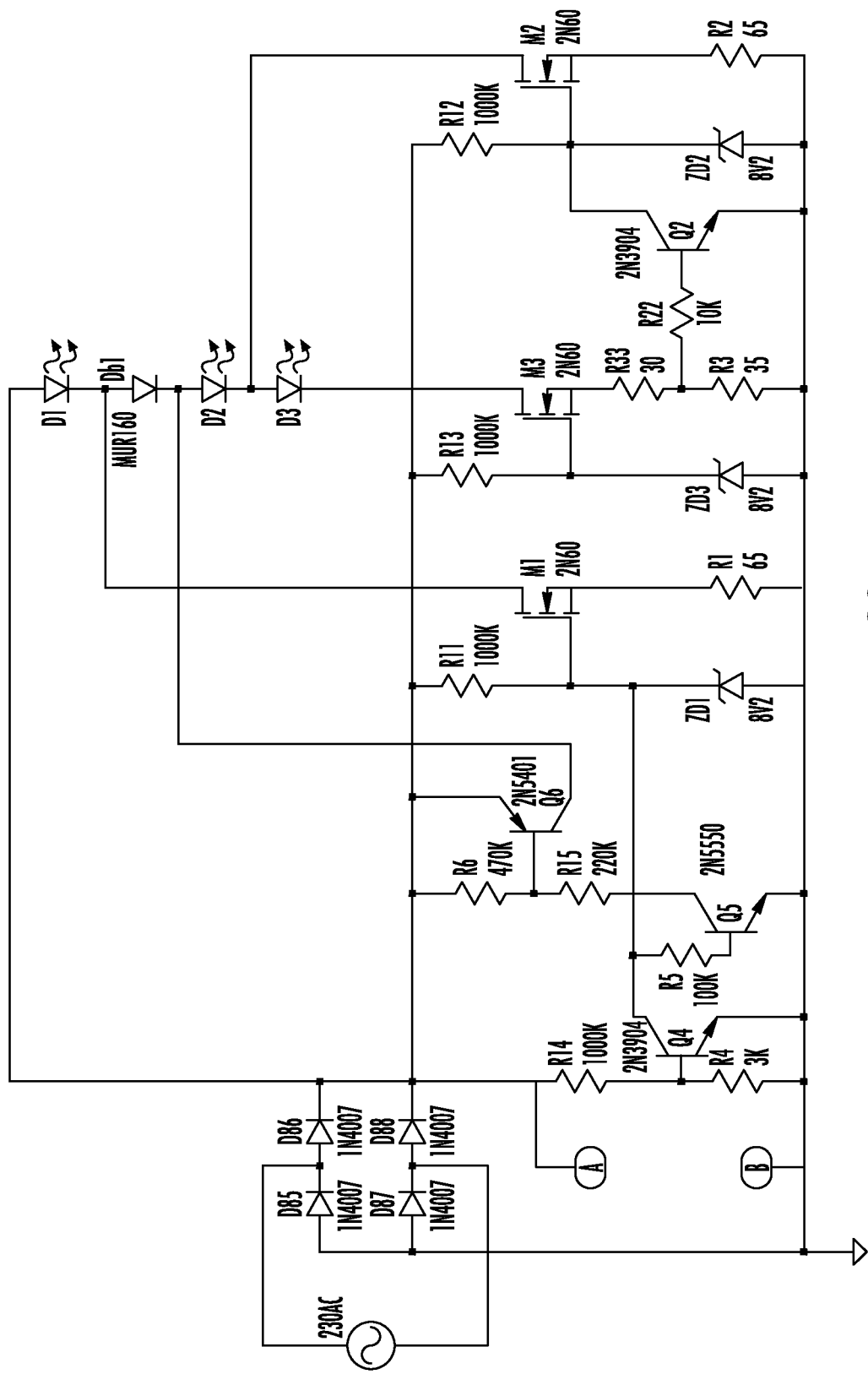
FIG. 20 is a circuit diagram showing a practical implementation of the circuit shown in FIG. 18.
Figure 21:
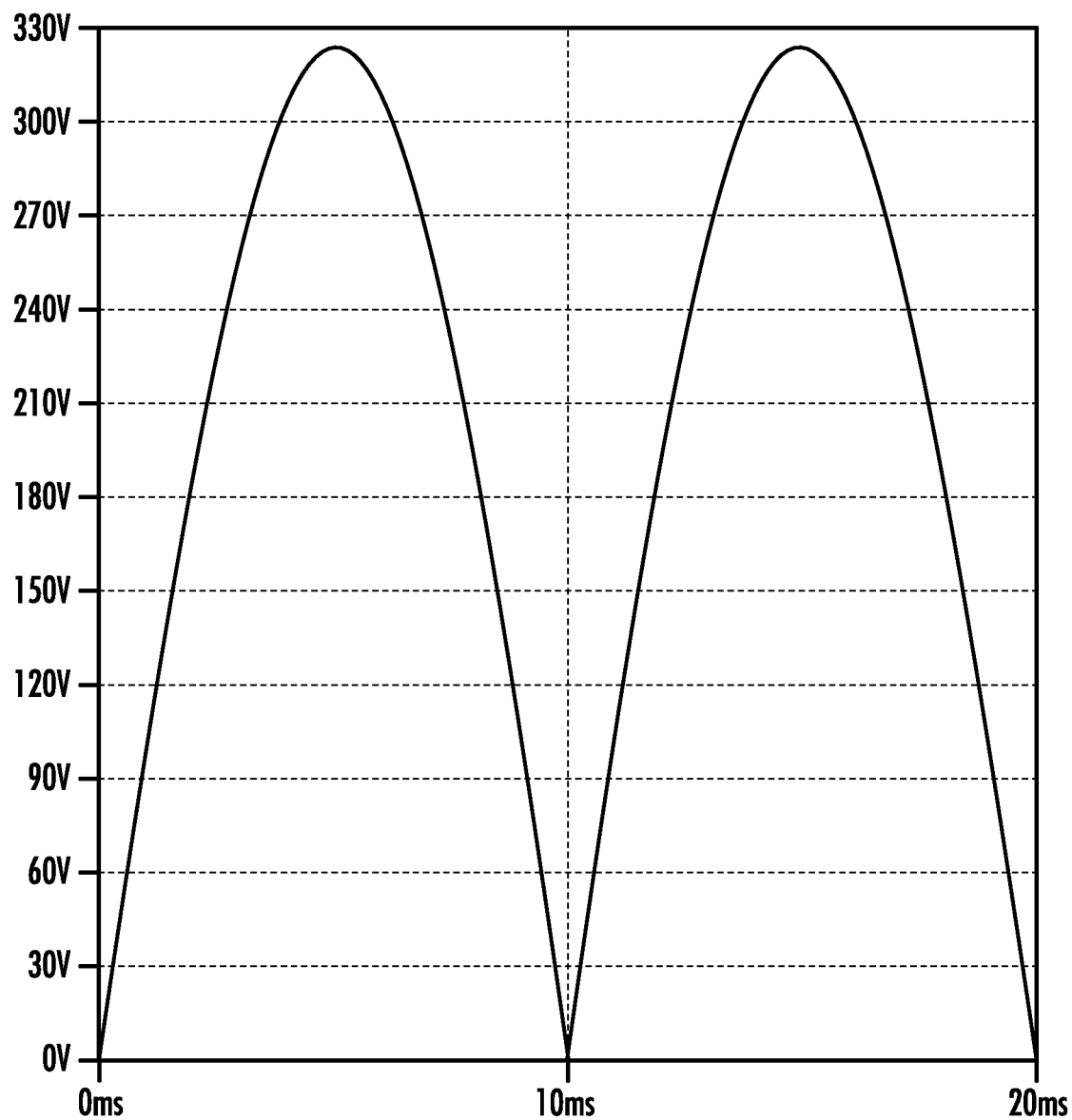
FIG. 21 is a diagram of the rectified mains voltage in FIG. 20.

FIG. 20 shows a practical exemplary detailed implementation of the proposed circuit shown in FIG. 18. In the figure, the AC 230V mains voltage is a rectified signal. The voltage waveform across node A and B is shown in FIG. 21. Three LED arrays D1-D3 are used. The forward voltage of LED array D1 is 150V and forward voltage of both LED arrays D2 and D3 are 75V in the illustrative embodiment.

As can be seen in the figure, transistor M1, resistors R1 and R11, and Zener diode ZD1 form a current source (generally corresponding to current source G1 in FIGS. 18 and 19) which drives LED array D1. Resistors R4, R14 and transistor Q4 form a voltage comparator corresponding to X1 in FIGS. 18 and 19. Transistor M2, resistors R2, R12 and Zener diode ZD2 form a current source corresponding to transistor G2 in FIGS. 18 and 19. Transistor M3, resistors R3, R33, R13 and Zener diode ZD3 form a current source corresponding to G3 in FIGS. 18 and 19.

Figure 22:
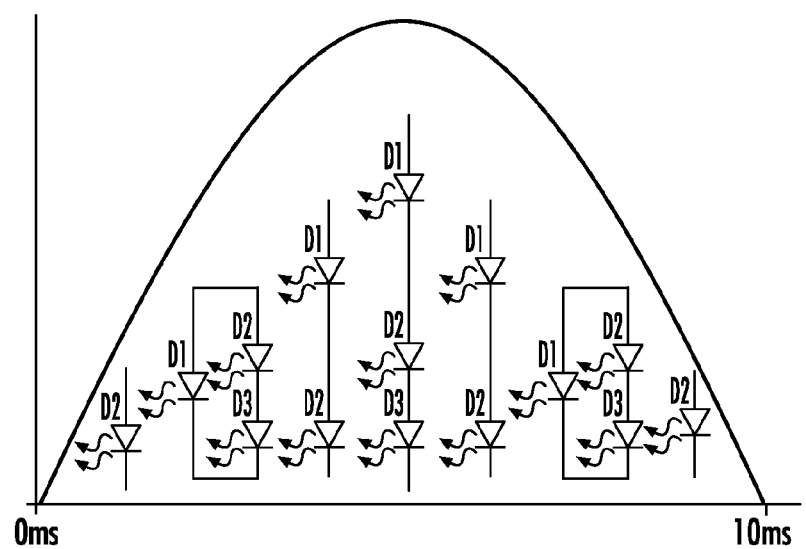
FIG. 22 is a diagram that shows the LED arrays that are conducting during a half AC cycle.

When the rectified mains voltage is low, transistors M1 and Q6 are conducting such that LED array D1 are parallel connected with LED arrays D2 and D3. In the exemplary embodiment, when rectified mains voltage level is above 225 VDC, transistor Q4 turns off transistor M1, transistor Q5 and in turn transistor Q6 making a series connection of LED arrays D1, D2 and D3. FIG. 22 is a diagram that shows the LED arrays that are conducting during a half AC cycle.

As can be seen in the diagram of FIG. 22, and as was also illustrated in the description above relating to FIGS. 19A-19G, during the period of time that the voltage of the voltage supply is equal to or greater than the reference voltage, a forward voltage string of serially connected LED arrays is formed, which increases as the voltage of the voltage supply continues to increase above the reference voltage, and which is shortened as the voltage begins to decline. In the illustration, the forward voltage string initially includes D1 and D2. As the voltage of the voltage supply approaches its peak, the forward voltage string includes D1-D3, and then, as the voltage of the voltage supply decreases, the length of the forward voltage string is reduced to D1 and D2.

As also shown in the diagram, during a portion of each period in which the voltage of the voltage supply is below the reference voltage, current will flow through all of the LED arrays D1-D3, but this will occur in a parallel configuration, with one branch having LED array D1, and the other branch having LED arrays D2 and D3, as discussed above with reference to FIGS. 19A-19G.

Figure 23:
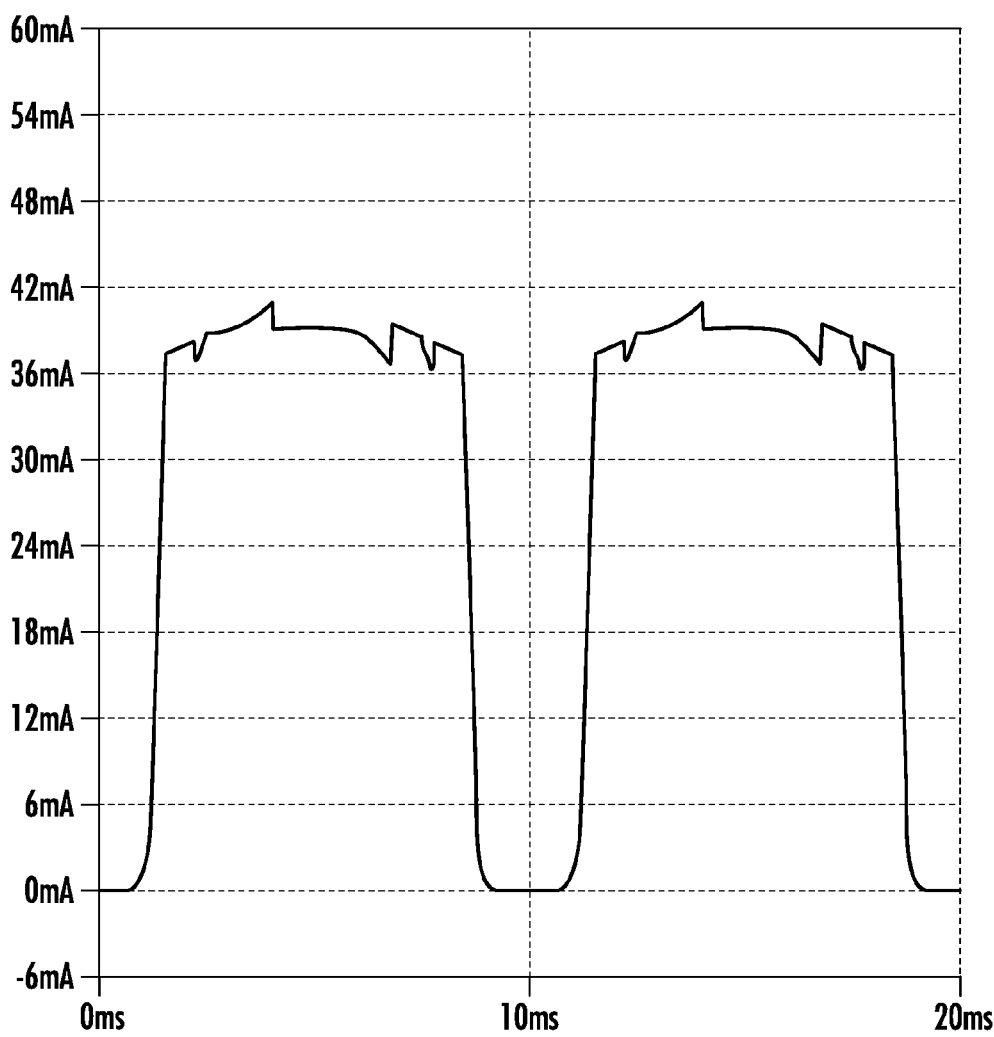
FIG. 23 is a diagram of the current through element D1 in FIG. 20.
Figure 24:
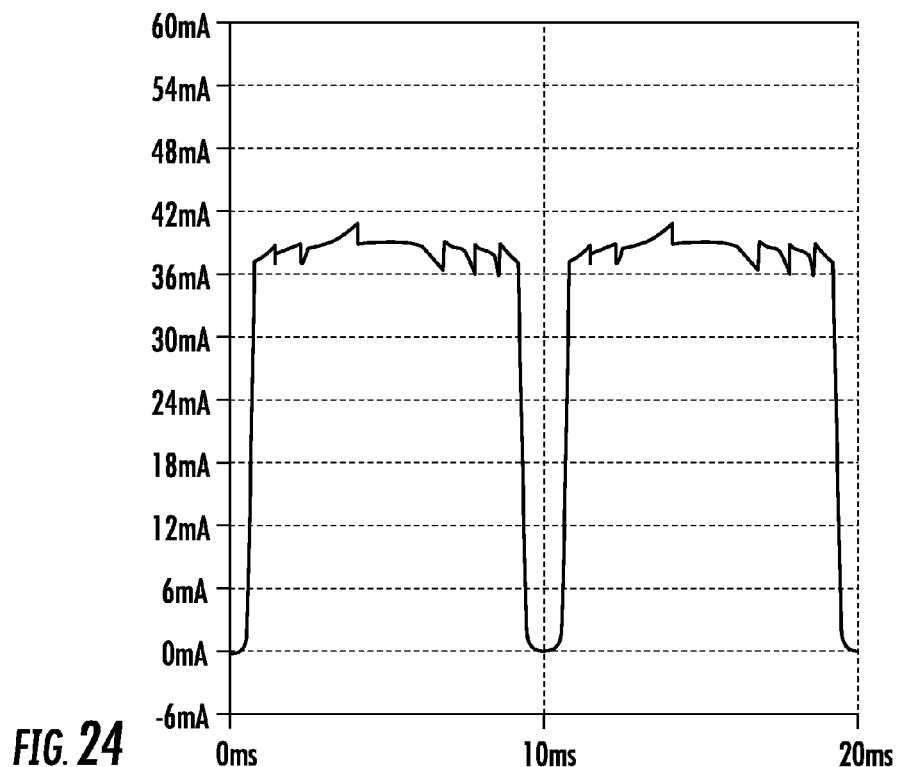
FIG. 24 is a diagram of the current through element D2 in FIG. 20.
Figure 25:
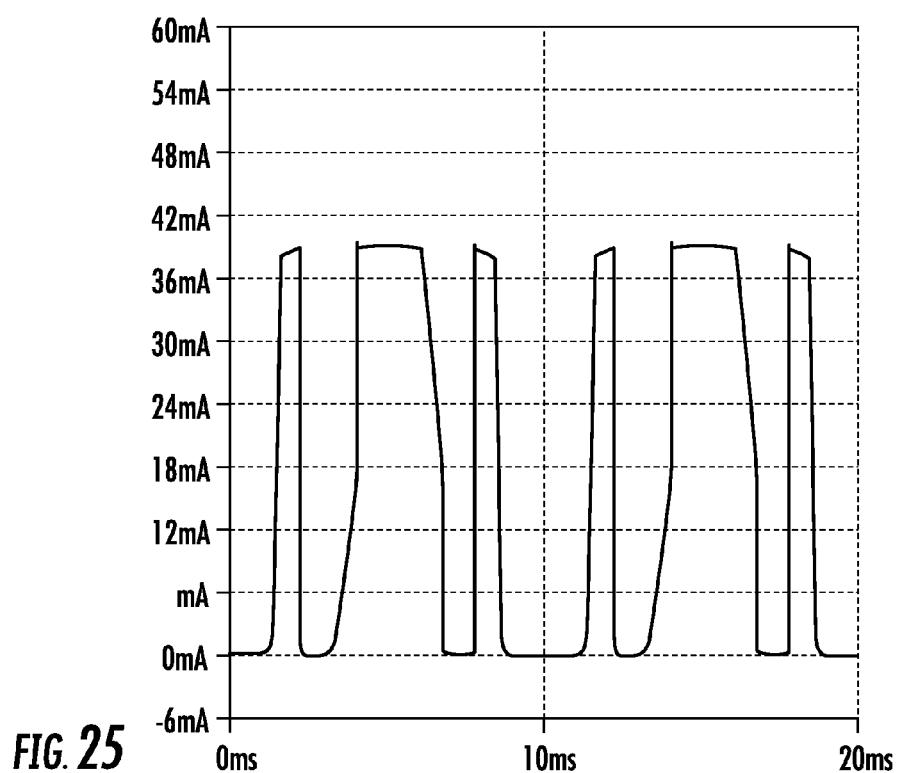
FIG. 25 is a diagram of the current through element D3 in FIG. 20.
Figure 26:
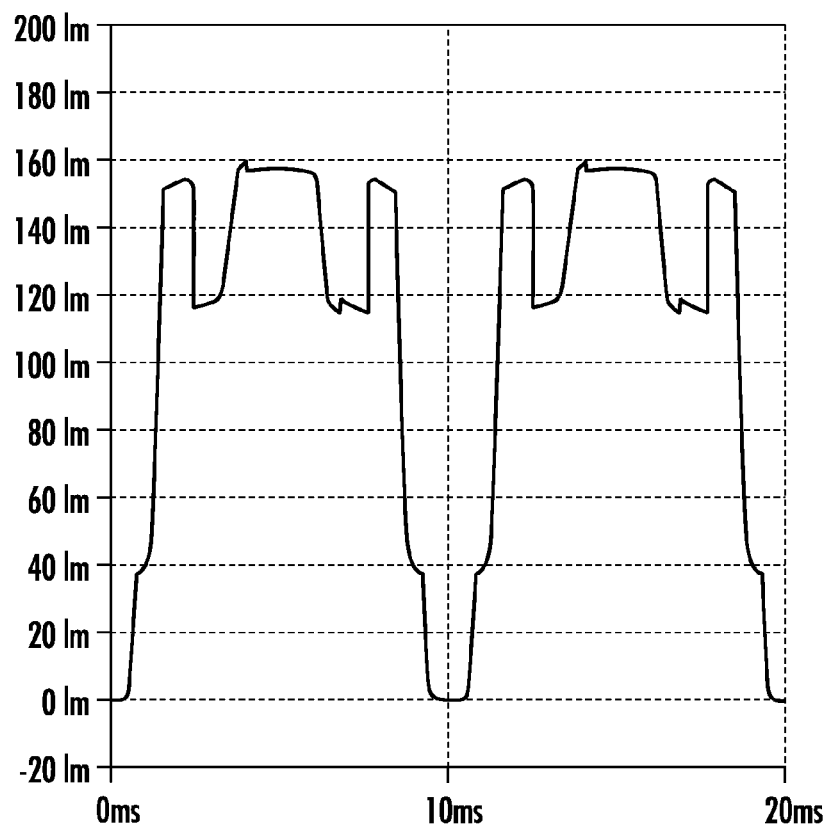
FIG. 26 is a diagram of the light output waveform of the circuit in FIG. 20.

FIG. 23 shows the current waveform of LED array D1. Waveforms of LED arrays D2 and D3 are shown in FIGS. 24 and 25 respectively. FIG. 26 shows the light output waveform of all the LED arrays. It should be noted the off time during zero crossing of the AC mains voltage is shorter than that in FIG. 13. The full light output time is also longer that that in FIG. 13.

Figure 27:
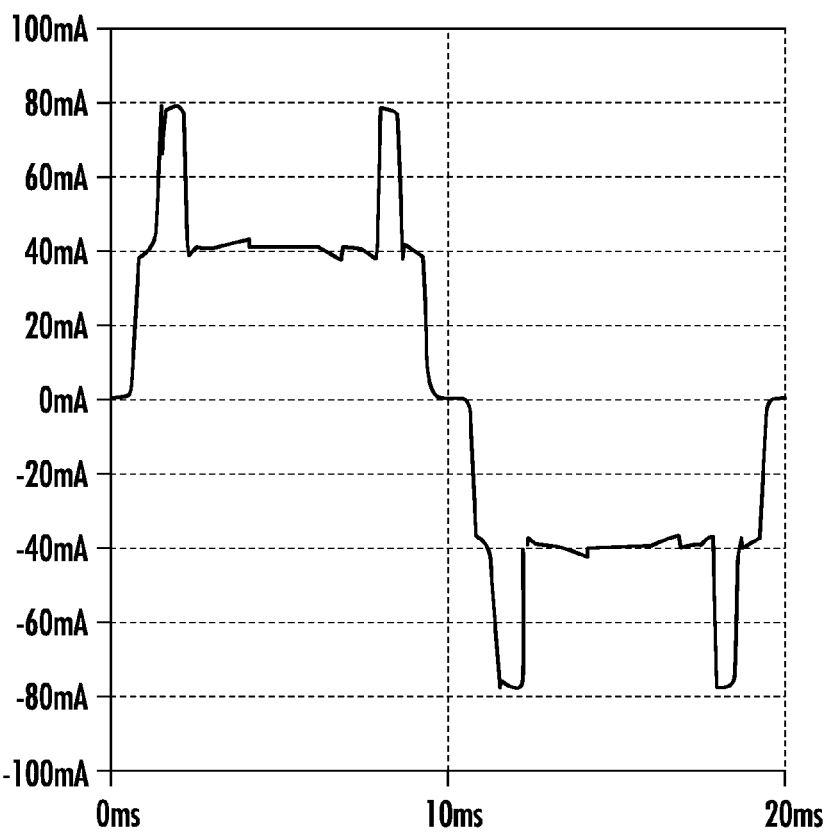
FIG. 27 is a diagram of the current of the AC mains source.

FIG. 27 shows the input current waveform from AC mains power source. The power factor for the exemplary circuit is about 0.85. Throughout most of the half line cycle, the current is continuous which makes the circuit suitable to work with triac dimmer. Efficiency of the illustrated exemplary circuit is about 84%.

Figure 28:
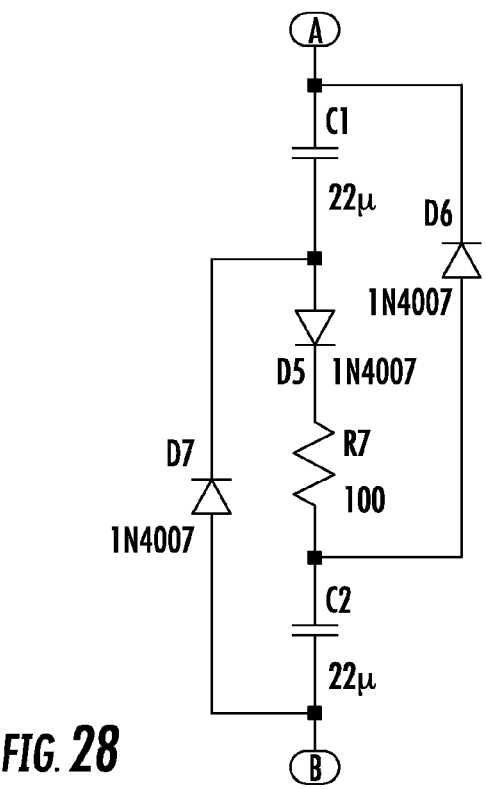
FIG. 28 is a diagram of an exemplary valley-fill passive power factor correction circuit.

An optional valley-fill passive power factor correction circuit can be added to improve the power factor and remove the off period at the zero crossing mentioned above. FIG. 28 shows an illustrative embodiment of an exemplary valley-fill circuit, which in use could be used to connect to nodes A and B of FIG. 20. In operation, the rectified mains voltage charges the valley-fill capacitors through the path C1, D5, R7 and C2. When the rectified mains voltage drops below half of its peak value, C1 begins to discharge through D7 and C2 begins to discharge through D6.

Figure 29:
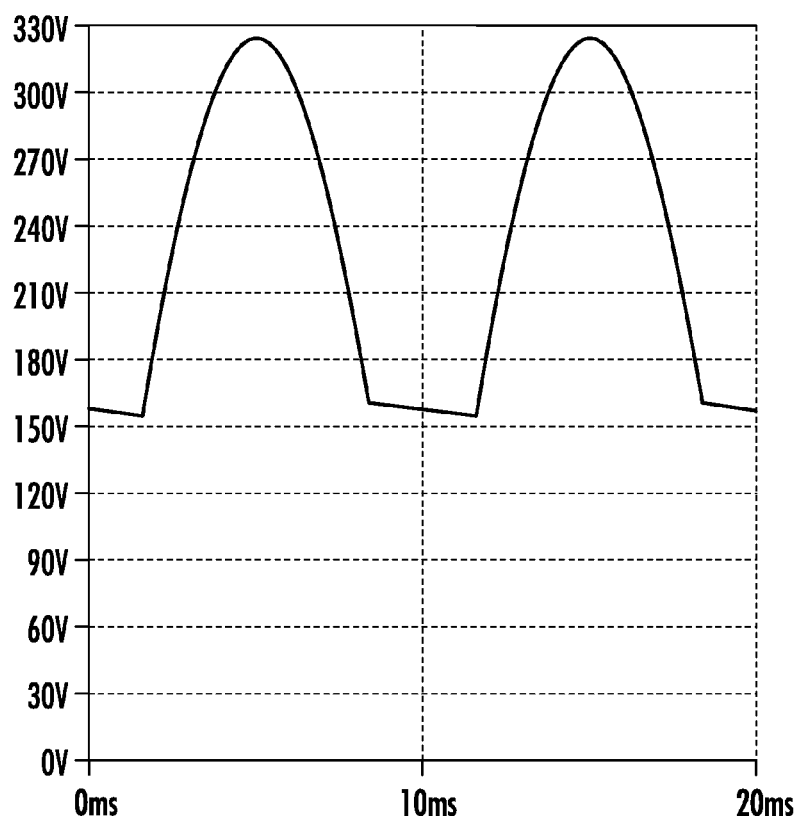
FIG. 29 is a diagram of the mains voltage waveform with the valley-fill circuit.

FIG. 29 shows the rectified mains voltage waveform with the exemplary valley-fill circuit. It can be seen that the voltage does not go below 150 VDC because of presence of the energy storage capacitors C1 and C2 in the valley-fill circuit.

Figure 30:
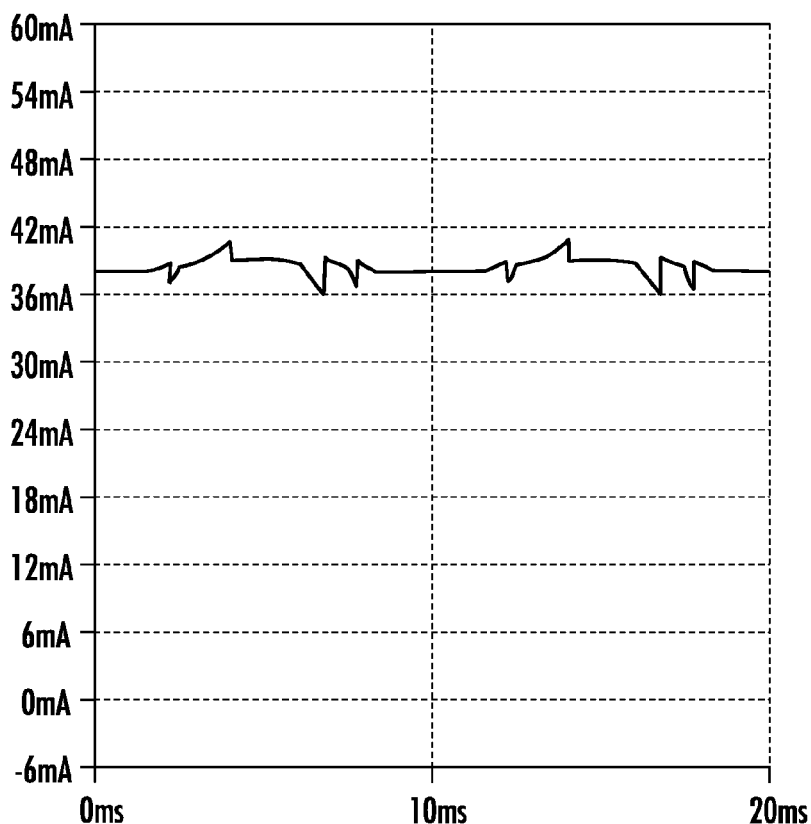
FIG. 30 is a diagram of the current through element D1 with the valley-fill circuit.
Figure 31:
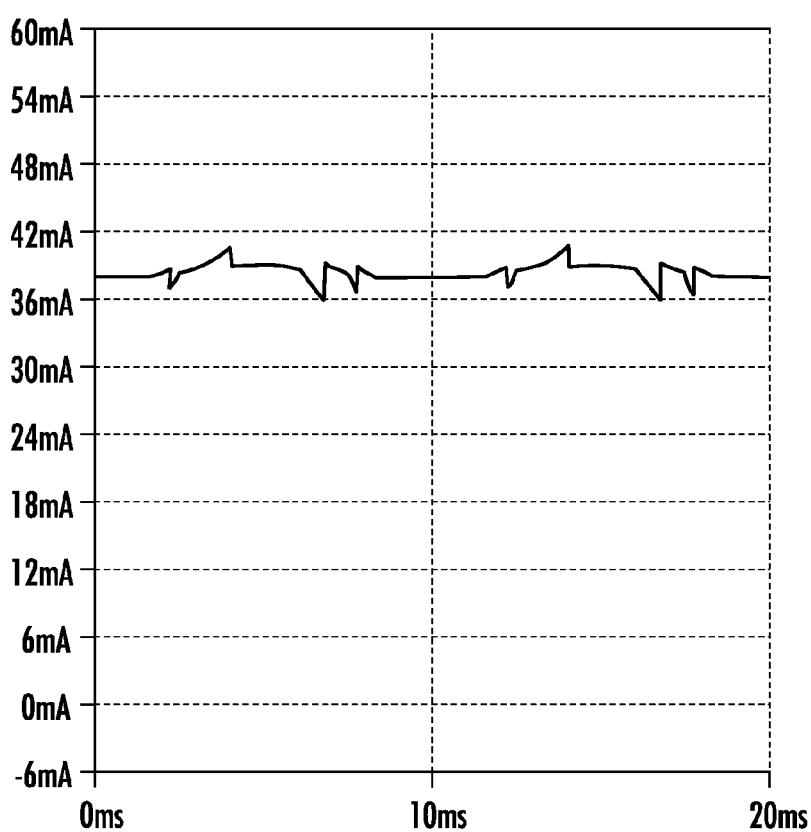
FIG. 31 is a diagram of the current through element D2 with the valley-fill circuit.
Figure 32:
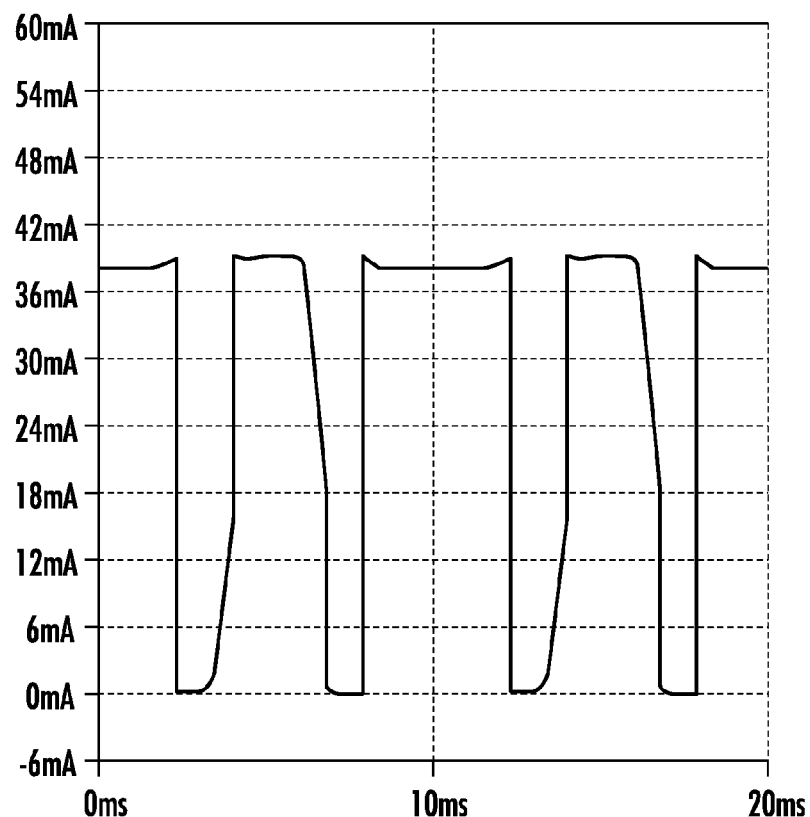
FIG. 32 is a diagram of the current through element D3 with the valley-fill circuit.
Figure 33:
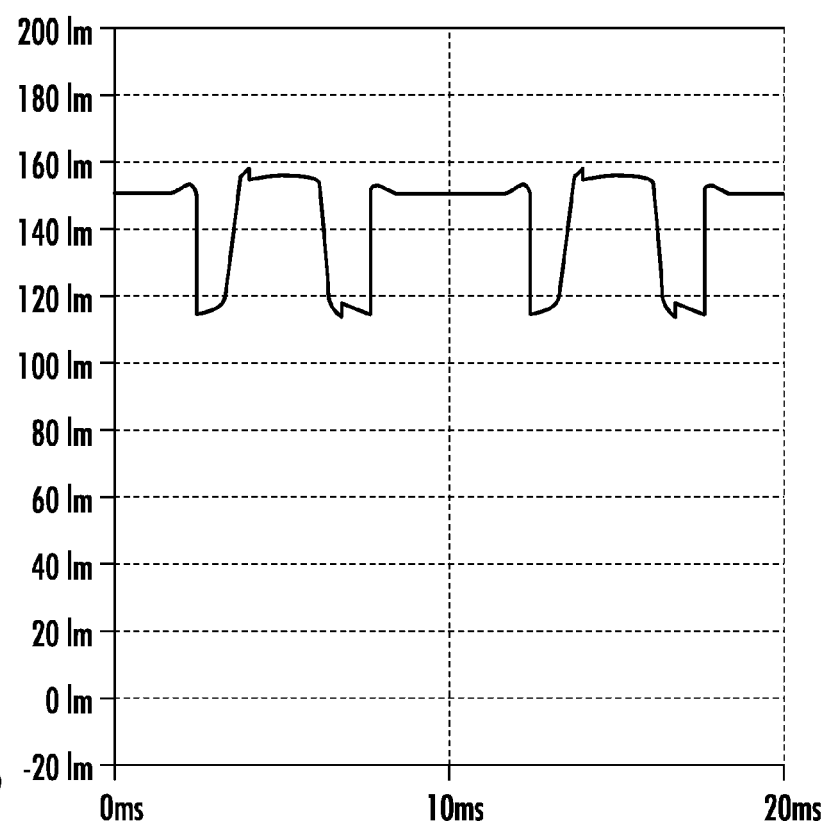
FIG. 33 is a diagram of the light output waveform of the circuit with the valley-fill circuit.

FIG. 30 shows the current waveform of LED array D1 using the valley-fill circuit. It is noted that because of the valley-fill circuit, the waveform contains no off period. FIG. 31 shows the current waveform of LED array D2, when the valley-fill circuit is used, which is similar to waveform of LED array D1. It should be noted that since the rectified voltage is always, in the exemplary circuit, above 150V (the sum of forward voltage of LED arrays D2 and D3 in the example), the stage shown in FIG. 19A above will never occur when using the valley-fill circuit. FIG. 32 shows the current waveform of LED array D3 using the exemplary valley-fill circuit. FIG. 33 shows the light output waveform of all of the LED arrays. It should be noted by virtue of the valley-fill circuit, there is no off period in the light output.

Figure 34:
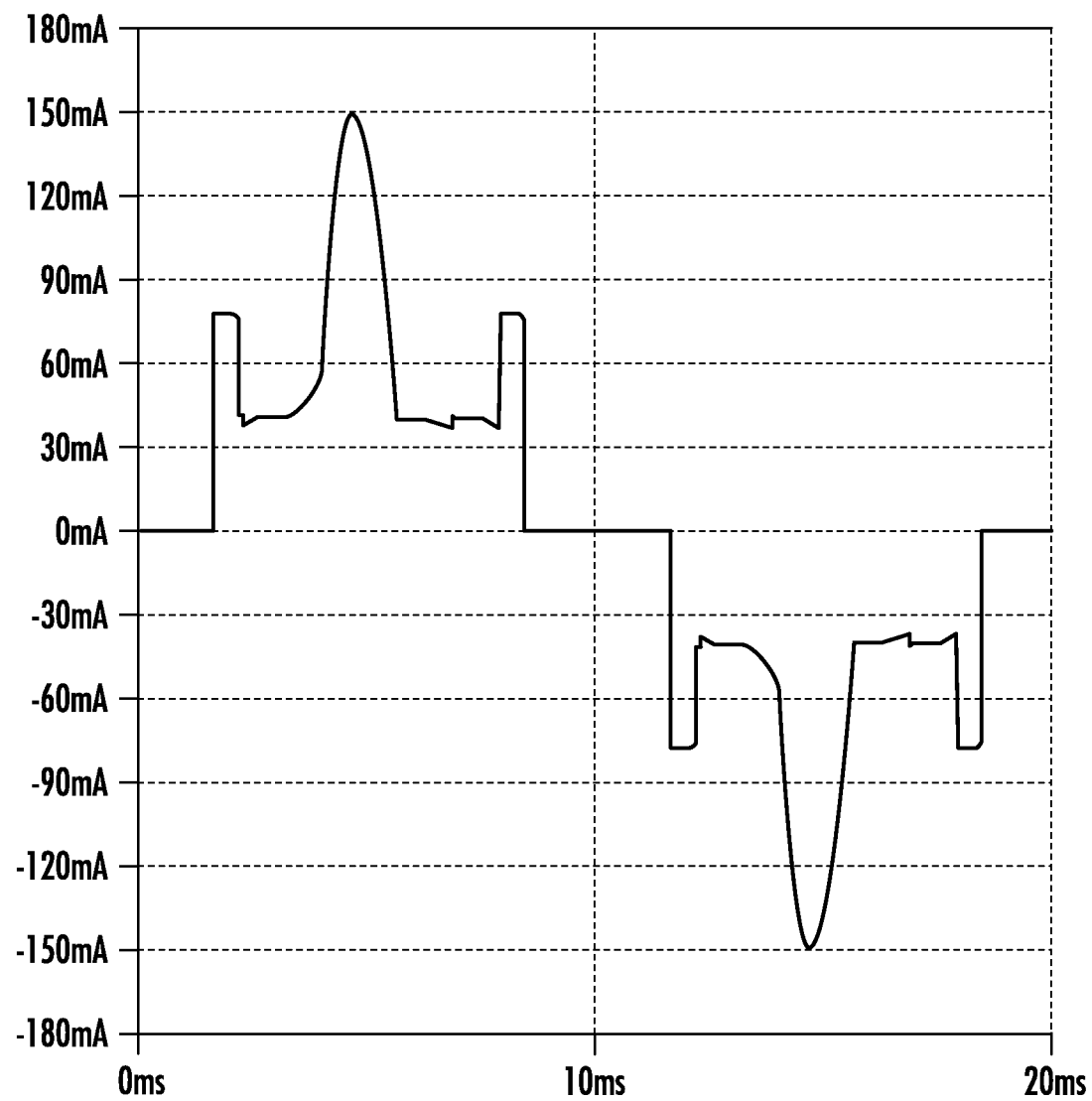
FIG. 34 is a current waveform of the AC mains source with the valley-fill circuit.

FIG. 34 shows the input current waveform from AC mains power supply using the exemplary valley-fill circuit. The power factor is improved to 0.9, while the efficiency of the circuit is kept at about 84%.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An LED array switching apparatus, comprising:
 a plurality of LED arrays arranged in a serial path, each LED array having a forward voltage;
 a voltage supply coupled to the plurality of LED arrays;
 a plurality of current sources selectively coupled to the plurality of LED arrays via a plurality of switches, respectively, each of the plurality current sources comprising:
  a first transistor having a gate, a drain, and a source, the drain being coupled to a respective one of the plurality of LED arrays;
  a second transistor having a base, a collector, and an emitter, the base being coupled to the source of the first transistor, the collector being coupled to the gate of the first transistor, and the emitter being coupled to ground; and a zener diode coupled between the collector and the emitter of the second transistor; and a controller configured to output a control signal that controls a respective one of the plurality of switches to convert the serial path of the plurality of LED arrays into two parallel paths that each have a portion of the plurality of LED arrays.

2. The LED array switching apparatus according to claim 1, wherein the control signal is generated from at least one of: (a) at least one comparison between the voltage of the voltage supply and at least one reference voltage, and (b) currents through one or more of the current sources.

3. The LED array switching apparatus according to claim 1, further comprising:
at least one diode arranged in the serial path of the LED arrays intermediate between a first group of LED arrays and a second group of LED arrays; and
a switchable parallel current path that connects the voltage supply to a point in the serial path between the diode and the second group of LED arrays,
the at least one diode preventing current from the parallel current path from flowing in the direction of the first group of LED arrays.

4. The LED array switching apparatus according to claim 3, wherein the number of LED arrays in the first group of LED arrays is equal to the number of LED arrays in the second group of LED arrays.

5. The LED array switching apparatus according to claim 3, wherein a plurality of parallel paths supplies current to all of the LED arrays when the voltage of the voltage source is higher than the forward voltage of both of the first or second group of LED arrays, but is less than the at least one reference voltage.

6. The LED array switching apparatus according to claim 1, wherein the voltage source is a rectified AC voltage, the switching apparatus further comprising:
valley-fill circuitry configured to prevent occurrence of any off period of light output at a zero crossing portion of the AC voltage.

7. The LED array switching apparatus according to claim 6, wherein the valley-fill circuitry includes at least one energy storage capacitor that discharges when the rectified AC voltage drops below half its peak value to prevent any off period of the light output.

8. The LED array switching apparatus according to claim 1, wherein at least one of the plurality of LED arrays comprises a plurality of LEDs.

9. The LED array switching apparatus according to claim 8, wherein the plurality of LEDs forming the at least one of the plurality of LED arrays are arranged in parallel.

10. The LED array switching apparatus according to claim 1, wherein the controller comprises one or more voltage comparators.

11. The LED array switching apparatus according to claim 1, wherein the controller comprises a microcontroller.

12. The LED array switching apparatus according to claim 11, wherein the microcontroller is configured to detect a fault in an LED array and modify a switching sequence to exclude the faulted LED array.

13. The LED array switching apparatus according to claim 2, wherein the at least one reference voltage is a plurality of reference voltages, and each of the plurality of reference voltages corresponds with a respective one of the plurality of switches.

14. An LED array switching apparatus, comprising:
a plurality of LED arrays arranged in a serial path, each LED array having a forward voltage;
a voltage supply coupled to the plurality of LED arrays;
a plurality of current sources selectively coupled to the plurality of LED arrays via a plurality of switches, respectively, each of the plurality of current sources comprising:
a first transistor having a gate, a drain, and a source, the drain being coupled to a respective one of the plurality of LED arrays;
a second transistor having a base, a collector, and an emitter, the base being coupled to the source of the first transistor, the collector being coupled to the gate of the first transistor, and the emitter being coupled to ground; and
a zener diode coupled between the collector and the emitter of the second transistor; and
a voltage comparator that is configured to compare the voltage of the voltage supply with a reference voltage to generate a control signal that controls one or more of the plurality of switches to:
close in response to the voltage of the voltage supply being less than the reference voltage, wherein the closing of the one or more of the plurality of switches converts the serial path of the plurality of LED arrays into two parallel paths that each have a portion of the plurality of LED arrays; and
open in response to the voltage of the voltage supply being greater than or equal to the reference voltage, wherein the opening of the one or more of the plurality of switches converts the two parallel paths into the serial path of the plurality of LED arrays, wherein,
when the voltage of the voltage supply is greater than or equal to the reference voltage, as the voltage of the voltage supply increases, LED arrays are lit to form a higher forward voltage LED string, and as the voltage of the voltage supply decreases, LED arrays turn off and are removed from the LED string starting with a most recently lit array.

15. The LED array switching apparatus according to claim 14, wherein for at least a portion of time during which the voltage of the voltage supply is below the reference voltage, the two parallel paths comprise a plurality of parallel paths each including at least one of the LED arrays, the plurality of parallel paths supplying current to all of the LED arrays.

16. The LED array switching apparatus according to claim 14, further comprising:
a diode arranged in the series path of the LED arrays intermediate between a first group of LED arrays and a second group of LED arrays; and
a switchable parallel current path that connects the voltage supply to a point in the series path between the diode and the second group of LED arrays,
the diode preventing current from the parallel current path from flowing in the direction of the first group of LED arrays.

17. The LED array switching apparatus according to claim 16, wherein the number of LED arrays in the first group of LED arrays is equal to the number of LED arrays in the second group of LED arrays.

18. The LED array switching apparatus according to claim 16, wherein a plurality of parallel paths supplies current to all of the LED arrays when the voltage of the voltage source is higher than the forward voltage of both of the first or second group of LED arrays, but is less than the reference voltage.

19. The LED array switching apparatus according to claim 14, wherein the voltage source is a rectified AC voltage, the switching apparatus further comprising:

valley-fill circuitry configured to prevent occurrence of any off period of light output at a zero crossing portion of the AC voltage.

20. The LED array switching apparatus according to claim 19, wherein the valley-fill circuitry includes at least one energy storage capacitor that discharges when the rectified AC voltage drops below half its peak value to prevent any off period of the light output.

* * * * *